United States Patent
Serizawa et al.

(10) Patent No.: US 7,090,577 B2
(45) Date of Patent: *Aug. 15, 2006

(54) RACE GAME SYSTEM AND METHOD OF ENTRY

(75) Inventors: Narito Serizawa, Tokyo (JP); Manabu Washio, Honolulu, HI (US); Hiroyuki Izuno, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 116 days.

This patent is subject to a terminal disclaimer.

(21) Appl. No.: 10/119,127

(22) Filed: Apr. 10, 2002

(65) Prior Publication Data

US 2002/0169013 A1    Nov. 14, 2002

Related U.S. Application Data

(62) Division of application No. 09/077,657, filed as application No. PCT/JP97/03650 on Oct. 9, 1997, now Pat. No. 6,632,138.

(30) Foreign Application Priority Data

Oct. 9, 1996  (JP) .................................. 8-268477
May 16, 1997  (JP) .................................. 9-126546

(51) Int. Cl.
    *A63F 13/00*   (2006.01)
(52) U.S. Cl. .............................. 463/6; 463/29; 463/42
(58) Field of Classification Search ................. 463/20, 463/6, 7, 24, 31, 36, 37, 29, 40, 41, 42, 25, 463/43; 434/62

See application file for complete search history.

(56) References Cited

U.S. PATENT DOCUMENTS

| 4,572,509 A | | 2/1986 | Sitrick | |
|---|---|---|---|---|
| 4,738,451 A | * | 4/1988 | Logg | 463/15 |
| 5,269,687 A | * | 12/1993 | Mott et al. | 273/454 |
| 5,354,202 A | * | 10/1994 | Moncrief et al. | 273/454 |
| 5,366,376 A | * | 11/1994 | Copperman et al. | 273/148 B |
| 5,368,484 A | * | 11/1994 | Copperman et al. | 273/148 B |
| 5,586,257 A | * | 12/1996 | Perlman | 463/42 |
| 5,762,552 A | * | 6/1998 | Vuong et al. | 463/25 |
| 5,772,504 A | * | 6/1998 | Machiguchi | 463/6 |
| 5,846,132 A | * | 12/1998 | Junkin | 463/42 |
| 5,921,780 A | * | 7/1999 | Myers | 434/29 |
| 5,984,787 A | * | 11/1999 | Redpath | 463/42 |
| 6,039,648 A | * | 3/2000 | Guinn et al. | 463/16 |
| 6,080,063 A | * | 6/2000 | Khosla | 463/42 |
| 6,155,927 A | * | 12/2000 | Levasseur et al. | 463/42 |

OTHER PUBLICATIONS

Battle.Net® Trademark registration, May 15, 1996, TESS, USPTO web site.*
Diablo II Multiplayer FAQ.*
Diablo II Realms FAQ.*
Diablo II Strategy Guide; Mulitplayer (Battle.net®) Chapter.*
Bowen et al. How to get the most out of Compuserve, Revised Fourth Edition. Bantam Books, New York, 1989, pp. 377-383.*

* cited by examiner

*Primary Examiner*—John M. Hotaling, II

(57) ABSTRACT

An object is to provide a free-entry type of race game apparatus wherewith a player can join at any time. This is a race game that simulates an endurance race in which many vehicles run for a long period of time. The vehicles are continually running on the track (ST 1), from which number a player selects any vehicle at will (ST 3) and joins the race in progress (ST 4, 5). The game is terminated on the basis either of a pass count indicating the number of cars passed (or passed by) (ST 6), or a limiting time (ST 7).

5 Claims, 22 Drawing Sheets

Vehicle selection screen

Zoomed screen

Scene of car running on track

Camera perspective during game

Start screen

RACE GAME SYSTEM AND METHOD OF ENTRY

This application is a Divisional of U.S. patent application Ser. No. 09/077,657 filed Dec. 7, 1998, now U.S. Pat. No. 6,632,138, which is a 371 of PCT/JP97/03560 filed on Oct. 9, 1997.

BACKGROUND OF THE INVENTION

1. Field of the invention

This invention concerns a game processing method, game apparatus, and game execution method. More specifically, it concerns the processing for games such as driving (auto race) games in which an object such as an automobile is made to move on a monitor screen in response to the manipulations of a player. It also concerns a game system and game method for conduction a driving (auto race) game, for example, comprising a plurality of consoles interconnected via communications means, wherewith a plurality of players compete with each other between the consoles.

2. Description of the Related Art

With the advances being made in computer graphics technology in recent years, image processing apparatuses are being proposed for providing various kinds of images. Among these apparatuses are those used in so-called TV game apparatuses, such as race games, shooting games, simulation games, and action games.

Whether these game apparatuses are used in the home or in business, there is a demand for displaying images mote vividly and realistically. In general, game apparatuses comprise a game apparatus main unit having a built-in computer for executing previously stored game programs, a controller for sending control signals to the computer to issue movement commands to objects represented in the game, a display for displaying images associated with the game development as the game program is executed by the computer, and an audio unit for generating audio to accompany the game development.

In recent game apparatuses, in order to make the screens high-quality and powerful, image data are defined in virtual three-dimensional coordinate space to position objects ("player characters" or "player drivers") and background items, etc., and to display scenes which are viewed from prescribed viewpoints.

Game apparatuses that handle driving games (auto race games) constitute one field among game apparatuses configured in this way, and among them, in turn, are contest games in which a plurality of players participate and compete for standings.

In the contest games already existing, however, such as driving games, it has been impossible to enter the game once it has already been started. In a system supporting communication between a plurality of game apparatuses that are interconnected, for example, a demonstration is first displayed to attract participants. Seeing this, multiple players start the game simultaneously, and match their skills against one another. The general rule with game apparatuses such as this is that the game must be started simultaneously in order for the plurality of players to compete fairly for standings. For example, if four people have first started to play a game in normal fashion, and then a friend of theirs comes along, he or she will not be able to participate in the game already begun. Thus conventional game apparatuses, while touting their communications capabilities, can only support play between a circle of friends, and do not perform the role of true "communications" that would allow play by an indefinite number of people.

In the driving games already existing, moreover, the method adopted for determining that a game is over is a time-expiration control system that terminates the game if the prescribed course is not finished within a certain time period. This time-expiration system is mainly suitable for stand-alone installations. It is not always suitable, in terms of game interest, in multi-play implementations in which an indefinite number of players can enjoy the game using a plurality of game apparatuses that support intercommunications. With the time-expiration system, for example, whether or not to extend a game is left up to the top player only, so that the following players can only aim at the top position in a race while not knowing when that race might end. When this is the case, patterns may develop in which a game is continued irrespective of the will of the players, or it might be impossible to reach the top position due to a spontaneous accident that happens irrespective of the relative skill (technique) of the player, with the game then being terminated irrespective of the will of the players.

The present invention has been devised in order to resolve the problems noted above, and an object thereof is to provide a game processing method and game apparatus wherewith players may join at any time, and wherewith game development is predicated on the skill and luck of the players themselves, so that improper game terminations can be eliminated.

As already noted, in conventional competition games, such as driving games, for example, it is not possible for a player to join in after the game has already been started. In a communications-capable game system wherein a plurality of game apparatuses are interconnected, a demonstration is first displayed to attract participants. Seeing this, a plurality of players start the game simultaneously, and match their skills against one another. Ordinarily, with such a game system as this, the game is begun with a simultaneous start. Thus, if, for example, four people begin competitive play via communications, and then another participant comes along, that other participant cannot join the game that is already in progress. He or she must wait for the competitive game in progress to end before joining the competitive play.

In this competitive game, in the case of a driving game, the method adopted for determining that a game is over is the time-expiration control system which terminates a game if a prescribed course is not completed within a certain time. when a game terminates by meeting this condition, the race standings, etc., are displayed. At this juncture, new participants may join the game (or replace losing players), so that communications-based competitive play is resumed with a new plurality of players. In other words, when communications-based play is to be continued, the steps of "game termination," "addition of (replacement by) new participants, " and "game resumption" are necessary, in that order, between one game and the next. It has been pointed out that the excitement over and interest in the competitive play can be extinguished by this "between" time.

Furthermore, in a conventional driving game, new participants are solicited (determined) every time a game is over, so that a player who has won first place in the last game has little sense of "surviving." In other words, there is no game continuity wherein the results of previous games are automatically reflected by the system. Thus a skillful player can do nothing more than continue making high-scoring games, one at a time. This can greatly diminish one's interest in the game.

An object of the present invention, which has been devised in order to resolve the problems noted above, is to provide a free-entry multiple-player competition game system and game execution method wherewith other players can join (enter) a communications-based competitive game at any time, the "between" time between one game and the next is eliminated so that multiple games can be carried on continuously, and game results are handled so that the results of previous games are automatically reflected in succeeding games.

SUMMARY OF THE INVENTION

A game apparatus according to the present invention comprises advancing means for continuing and advancing a race game involving a plurality of vehicles irrespective of whether or not players are present; selection means for the selection by a player of one of the plurality of vehicles; control shifting means for shifting the control of a selected movable object to a player; and control termination means for terminating control by the player when the selected vehicle has satisfied certain conditions.

This type of race includes car races, seagoing races, airplane races, and spacecraft races, etc. The race is perpetuated automatically by a CPU, for example, and a player can join a race whenever he or she so desires. Accordingly, it is possible for a game to be always advancing, irrespective of the presence or absence of players, so that new situations can continually be enjoyed.

A game apparatus according to the present invention comprises advancing means for automatically advancing a game, following a predetermined program, and automatically controlling a plurality of objects; selection means for permitting a player to select one of a plurality of objects; control shifting means for shifting the control of the object selected by the player to the player; and control termination means for terminating control by the player when the selected object has satisfied certain conditions.

This type of game includes non-time-restricted battle games and war simulation games, etc. In the case of a race game, moreover, this might extend to situations where a racing machine is making a pit stop, for example.

A game apparatus according to the present invention is such that said advancing means comprise: parameter changing means for changing the performance parameters of the vehicle or object as time elapses; replenishing means for moving the selected vehicle or object, by the control of the player, to a designated position for the purpose of restoring the performance parameters; and reinstating means for reinstating the vehicle or object after the performance parameters have been restored.

In a real auto race, for example, there are pit stops, and here these are incorporated into the game. As the distance that a vehicle runs lengthens, there is a degradation of various performance factors. These situations are also simulated in the game. An example of a process for restoring these parameters is the pit stop in an auto race. It is also permissible to make it possible to regulate the degree of parameter restoration according to the type of replenishment selected in the replenishing step, the elapsed time, or the condition of the vehicle, etc. Performance parameters might include, for example, tire wear rate, engine performance, transmission performance, steering performance, and fuel remaining, etc.

A game apparatus according to the present invention is such that the advancing means comprise environmental condition changing means for changing the environmental conditions as the game advances.

The track surface and weather conditions might be continually changing, for example, until reset. Or the debris scattered onto the track surface by a crash might be left there. This would permit a more realistic game progression to be enjoyed.

A game apparatus according to the present invention is such that the advancing means maintain the number of the vehicles or objects constant.

Since the number of vehicles, etc., that are racing is kept constant, the race can always be conducted fairly. However, it is also possible to implement these as means for handling customers by having a distributor or operator perform setting operations.

A game apparatus according to the present invention is such that the advancing means set environmental conditions for the progress of the game by selecting from among a plurality of predetermined environmental conditions.

For example, an operator might make the initial environmental condition settings. These environmental conditions may contain such elements as track surface conditions, temperature, humidity (coefficient of friction between tires and track surface),presence of debris or oil on the track, when rain is to start and stop, etc. Accordingly, all kinds of race developments can be expected even with the same game apparatus, so that more interesting game progressions can be enjoyed.

A game apparatus according to the present invention is such that the selection means comprise a position detection means for finding the position of the selected vehicle or object; and a situation changing means for changing the situation of the selected vehicle or object when the prescribed position where a player is to join a game in progress is far from the position of the selected vehicle or object; and the control shifting means comprises a first vehicle control means for shifting the control of the selected vehicle or object to the player, after waiting for the selected vehicle or object to approach the prescribed position where the player is to join a game in progress, when the prescribed position is close to the position of the selected vehicle or object; and a second vehicle control means for moving the selected vehicle or object to the prescribed position where the player is to join a game in progress, and transferring the control of the selected vehicle or object to the player, when the prescribed position is close to the position of the selected vehicle or object.

The situation changing means noted above are not a mandatory component; vehicle control may be transferred without changing the situation whatsoever.

Because the selected vehicle is to enter a race in progress, it is necessary to naturally return to the start position by some method or other, and to transfer control over to the player. If the distance is short to the start position, then the start position can be naturally attained by moving the vehicle without changing its situation. If that distance is considerable, then the vehicle is returned naturally to the start position by changing its situation. In an auto race, for example, a mishap or other trouble may be generated to stop the race, and then the vehicles may be pulled to the start position by wreckers. In this way, faster and natural control transfer is made possible.

A game apparatus according to the present invention is such that the selection means select the vehicle or object to which a mark is attached corresponding to an input mark.

One possibility, for example, is to have the number of the game console used as the number of the vehicle. If a console is unattended, then that car can be driven. This method is readily understood by players.

A game apparatus according to the present invention is such that the control terminating means comprise a determination means for terminating control based on a pass count that indicates the number of times a passing encounter has occurred between the selected vehicle or object and other vehicles or objects.

A game apparatus according to the present invention is such that the pass count for the vehicle or object is determined by measuring the position of the vehicle or object with reference to designated points within blocks provided along the course.

In an auto race, the pass count is kept by adding 1 every time a vehicle passes an opponent, and subtracting 1 every time that vehicle is passed by an opponent. The pass count at the beginning of a game is set to an appropriate initial value. Pass counts make processing easy even when participants are permitted to join while a race is in progress.

A game apparatus according to the present invention is such that the control terminating means comprise score computing means for computing scores relating to the competition results of the players.

In a point-scored game, for example, scores may be computed on the bases of distance run, times clocked, or number of opponents passed within a certain time frame in minutes or distance frame in kilometers.

A game apparatus according to the present invention is such that the control terminating means terminate the control by that player when a prescribed amount of time has elapsed.

A time limit might be imposed, for example, by stopping the race after 24 hours.

A game processing method according to the present invention is a game processing method that perpetuates a race game, irrespective of the presence or absence of players, comprising: a selection step by which players select vehicles from among a plurality of vehicles during a race; a joining step by which players join the race using the selected vehicles; a game perpetuating step that perpetuates the race game with the plurality of vehicles that includes the selected vehicles; and a game-termination processing step that terminates the game when the selected vehicles have satisfied prescribed conditions.

This type of race includes auto races, seagoing races, airplane races, and spacecraft races, etc. The race is perpetuated automatically by a CPU, for example, and a player can join a race whenever he or she so desires.

A game processing method according to the present invention is such that the joining step comprises: a position detection step for determining the position of the selected vehicle; a first vehicle control step that, when the position of the selected vehicle is close to the prescribed position where a player is to join a race in progress, waits for the selected vehicle to draw near to the prescribed position, and then transfers control of the selected vehicle to the player; a situation changing step for changing the situation of the selected vehicle when the position of the selected vehicle is far from the position where the player is to join the race in progress; and a second vehicle control step that forces the selected vehicle to move to the prescribed position and then transfers control of the selected vehicle to the player.

The situation changing step noted above is not a mandatory component; it is permissible to transfer the control of a vehicle without changing its situation.

Because the selected vehicle is to enter a race in progress, it is necessary to naturally return to the start position by some method or other, and to transfer control over to the player. If the distance is short to the start position, then the start position can be naturally attained by moving the vehicle without changing its situation. If that distance is considerable, then the vehicle is returned naturally to the start position by changing its situation. In an auto race, for example, a mishap or other trouble may be generated to stop the race, and then the vehicles may be pulled to the start position by wreckers.

A game processing method according to the present invention is such that the game perpetuating step comprises: a parameter changing step that changes the performance parameters of the vehicles as time elapses; a replenishing step for moving the selected vehicle to a prescribed position for restoring the performance parameters thereof; and a reinstating step for reinstating the vehicle in the race after the performance parameters have been restored.

In a real auto race, for example, there are pit stops, and here these are incorporated into the game. As the distance that a vehicle runs lengthens, there is a degradation of various performance factors. These situations are also simulated in the game. An example of a process for restoring these parameters is the pit stop in an auto race. It is also permissible to make it possible to regulate the degree of parameter restoration according to the type of replenishment selected in the replenishing step, the elapsed time, or the condition of the vehicle, etc. Performance parameters might include, for example, tire wear rate, engine performance, transmission performance, steering performance, and fuel remaining, etc.

A game processing method according to the present invention is such that the game-termination processing step determines when the game is over based on a pass count indicating the number of passing encounters between the selected vehicle and other vehicles. A game apparatus according to the present invention is such that the pass count for the vehicle is determined by measuring the position of the vehicle with reference to designated points within blocks provided along the course.

In an auto race, the pass count is kept by adding 1 every time a vehicle passes an opponent, and subtracting 1 every time that vehicle is passed by an opponent. The pass count at the beginning of a game is set to an appropriate initial value.

A game apparatus according to the present invention comprises: a plurality of game machines, each comprising: an image processor for generating game screens; and a communications controller that is connected to the image processor and that performs control while communicating with the other equipment; and connection means for connecting the communications controllers of the plurality of game machines; wherein the image processors execute all of the processes noted above.

A game apparatus according to the present invention comprises: control means for obtaining information on race conditions from at least one of the plurality of game machines and determining display images; and an external monitor or monitors for displaying the display images determined by the control means.

The controller determines images that the players can reference in response to the situations of the vehicles that are contesting a race. For example, if the distance between vehicles is great, this can be plotted on a map and displayed, and if small, this can be displayed as a camera cut. If one vehicle enters the pits, that situation can be displayed. If trouble develops, the affected vehicles can be displayed. And when the game is over the award ceremony or victor can be displayed.

A game apparatus according to the present invention is such that each of the plurality of game machines comprises a display unit for displaying information concerning race conditions.

The display unit may display who is in the lead, what lap the leader is on, or which players are present, etc.

A game apparatus according to the present invention is such that, in the plurality of game machines, each of the image processors, respectively, processes previously allocated data, and each of the communications controllers, respectively, outputs processed data to the other game machines, receives data processed by the other game machines, and writes these data to a memory in the image processor.

Data are processed in prescribed periods. When the processing in one period is finished, all of the game machines access data processed by the other game machines. Accordingly, all data are processed while leveling out the processing burden by distributed processing, so that all of the game machines can use all of the data. This facilitates efficient data processing.

A recording medium according to the present invention is a recording medium in which are recorded procedures for causing processors to function as one or other of the means noted in the foregoing, namely the advancing means, selection means, control means, and control termination means. This recording medium may be, for example, a floppy disk, magnetic tape, photomagnetic disk, CD-ROM, DVD, ROM cartridge, RAM memory cartridge with battery backup, flash memory cartridge, or non-volatile RAM cartridge. The recording medium is something on which information (mainly digital data and programs) is recorded by some physical means, and with which the prescribed functions can be elicited from a processor such as a computer or dedicated processor. Communications lines such as radio or telephone lines are also included in such recording media.

A game system according to the present invention comprises: game execution means that enable a plurality of players to join together and compete in a common game; pseudo-game execution means for permitting other players to artificially join a game in progress when there are such other players to join such game in progress; player setting means that, when competition of a certain scope in the game has been concluded, reflects the competition results for that game and automatically sets a new plurality of players to which the other players have been added; and game perpetuating means for causing the automatically set plurality of players to automatically participate in the game and for perpetuating that game.

In this way, players joining a game in progress can participate artificially in the game from the time they join it, and then, after the game has reached a certain stage, they can continue to participate, but now as official competing members, in the next scope of the game that will be automatically and continuously executed.

Preferably, the game noted above should be a driving game in which vehicles are used in competing in the game space. In this way it is possible to provide free-entry driving games which can be joined at any time even when a game is in progress.

The first embodiment of the pseudo-game execution means noted above involves means for providing competition with vehicles controlled by a computer comprised by the system. In this way, players joining while a game is in progress, although in a holding state waiting to join an official competition, can immediately join a pseudo-game based on a computer competition. Thus the sense of tedium while in the holding state can be eliminated.

One embodiment of the player setting means noted above comprises judgment means for determining the finish of a certain scope of the driving game; determining means for determining the results of the driving game when the finish has been determined; and setting means for setting the new plurality of players to which has been added the other players and the continuing players for the game designated by comparing the results of the first-mentioned game against predetermined conditions. In this way, it is possible to provide games wherein there is a sense of "survival" that reflects the results of the driving game in the next circuit battle.

One embodiment of the certain scope of the driving game noted above is the scope wherein a closed course, from start to finish, is run a prescribed number of times, in the virtual game space of a driving game. In this way, the prescribed number of circuit runs can be made the game unit, so that driving games of this game unit can be repeated continuously, and so that joining a game of that game unit that is in progress can be handled at any time. A player joining such a game in progress is able to artificially Join that game currently in progress, and can then automatically join the game at the next game unit as an official member. After one game-unit game has ended, the next game-unit game continues automatically without interruption.

A game execution method according to the present invention is a game execution method wherewith a plurality of players can participate competitively together in a common game; wherewith, when other players join the game while it is in progress, those other players are allowed to participate artificially in the game in progress; wherewith, when a certain scope of the competition in the game has been concluded in the game space, the results of that game competition are reflected and a new plurality of players to which the other players have been added is automatically set; wherewith this automatically set plurality of players is automatically made to join the game; and wherewith that game is perpetuated. In this way, the same operational benefits as provided by the game system described in the foregoing are obtained.

DESCRIPTION OF THE PREFERRED EMBODIMENTS

First Embodiment

A first embodiment of the present invention will now be described, making reference to the drawings.

Figure 1:
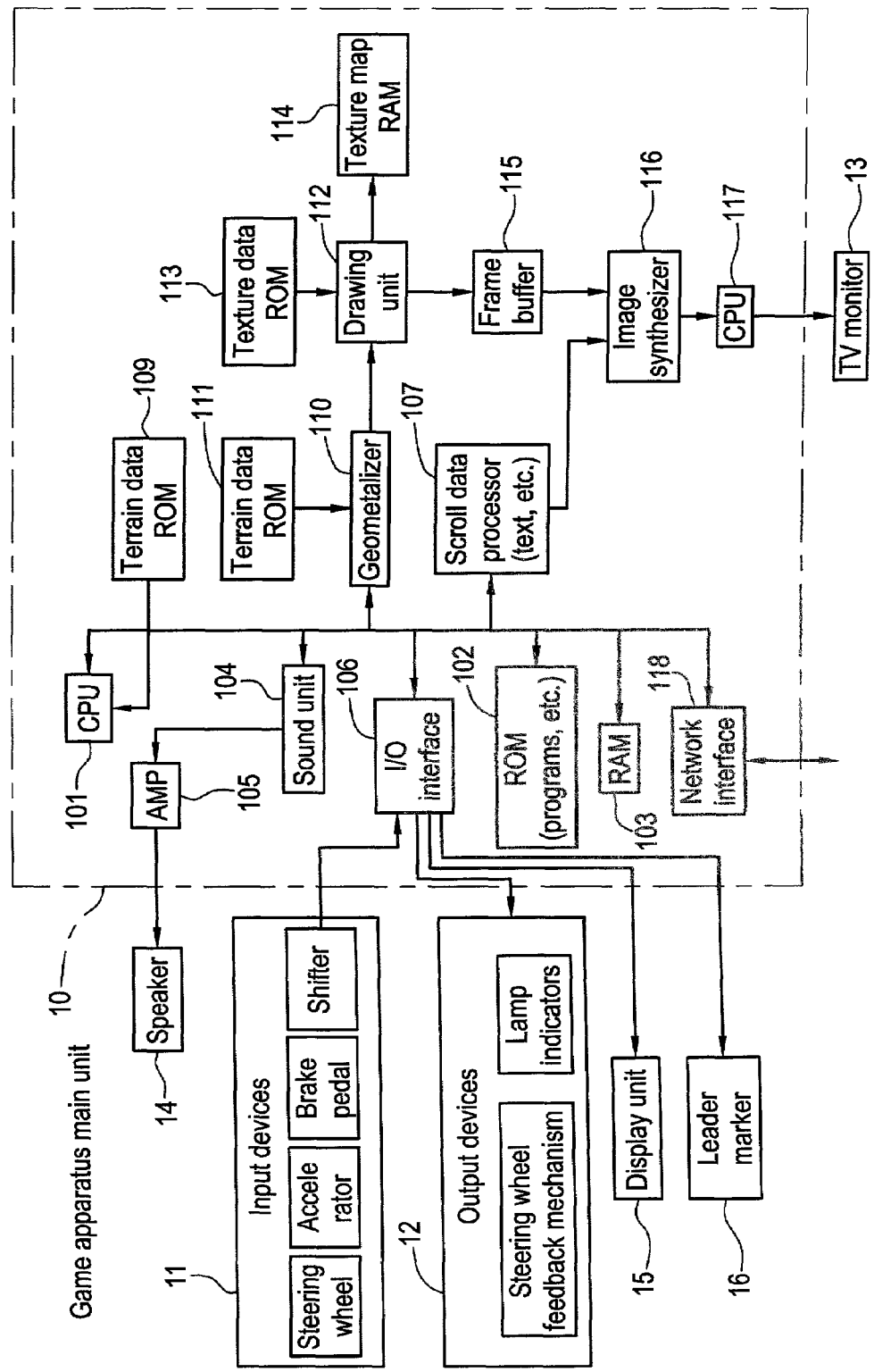
FIG. 1 is a functional block diagram of a game apparatus concerning a first embodiment of the present invention.

FIG. 1 is a block diagram of an image processor and a game apparatus in which that image processor is used which concern one embodiment of the present invention. This game apparatus comprises the main components of a game apparatus main unit 10, an input apparatus 11, and output apparatus 12, a TV monitor 13, a speaker 14, a display unit 15, and a leader marker 16.

The game apparatus main unit 10 comprises, in addition to a CPU (central processing unit) 101, a ROM 102, RAM 103, sound unit 104, input/output interface 106, scroll data processor 107, terrain data ROM 109, geometalizer 110, shape data ROM 111, drawing unit 112, texture data ROM 113, texture map RAM 114, frame buffer 115, image synthesizer 116, and D/A converter 117.

The CPU 101 is connected by a bus line to the ROM 102 which stores the prescribed programs, etc., RAM 103 which stores data, sound unit 104, I/O interface 106, scroll data processor 107, and geometalizer 110. The RAM 103 is made to function as a buffer, so it performs such functions as writing various kinds of commands to the geometalizer 110 (object display, etc.), and does matrix-writes when processing conversion matrices.

The I/O interface 106 is connected to the input apparatus 11 and output apparatus 12, by which means the operating signals such as from the steering wheel of the input apparatus 11 are taken into the CPU 101 as digitalized values. Signals generated in the CPU 101 can be output to the output apparatus 12. The sound unit 104 is connected via a power amplifier 105 to a speaker 14, and audio signals generated by the sound unit 104 are power-amplified and then sent to the speaker 14.

In this embodiment, the CPU 101, following the program stored in the ROM 102, reads out control signals from the input apparatus 11, terrain data from the terrain data ROM 109, and shape data (objects such as "subject vehicles" and "opponent vehicles," and three-dimensional data such as "moving track," "terrain," "sky," "spectators," "buildings," and other background) from the shape data ROM 111. The CPU 101 also performs at least such vehicle simulation processing as determining when there is contact between a vehicle and the terrain (impact), computation of the behavior of all vehicles, computation of body behavior (this is analogous to suspension behavior and will be described in detail subsequently), and determinations of collisions between vehicles.

The CPU 101 employs a three-dimensional coordinate system (global coordinate system) commonly called a right-handed coordinate system. The CPU reads terrain shape data from the terrain data ROM 109 and vehicle and other shape data from the shape data ROM 111, subjects these data to processing in response to input signals, and configures running images in which multiple vehicles are arranged in the coordinate system described above. These vehicles are made up of subject vehicles that can be driven by players and other vehicles (which may also be called opponent vehicles, as used above) that are controlled by the game apparatus.

Vehicle behavior processing simulates vehicle movements in virtual space according to player operating signals from the input apparatus 11. After coordinate values are determined in three-dimensional space, a conversion matrix for converting these coordinate values to a visual coordinate system and shape data (vehicles, terrain, etc.) are designated in the geometalizer 110. The CPU 101 is connected to the ROM 109 which holds data in which vehicles are defined as oval models for the purpose of determining impacts, and these predetermined data are passed to the CPU 101.

At this time, the CPU 101 primarily determines impacts between the terrain and the four wheels of the vehicles that are the objects, determines collisions between vehicles, and determines, when necessary, impacts between vehicles and structures. When making these determinations and computing vehicle behavior, the CPU 101 is also configured so that it will mainly handle floating decimal point computations. Consequently, vehicle-related contact determinations (impact determinations) are performed by the CPU 101, and the results thereof are provided to the same CPU 101, so the CPU processing load is reduced, and the contact determinations are performed more quickly.

The geometalizer 110 is connected to the shape data ROM 111 and the drawing unit 112. In the shape data ROM 111 are defined graphics and shapes (body coordinate system) of such objects as subject vehicles and opponent vehicles, made of combinations of multiple polygons, and such background as the terrain and sky. (The number of polygons here can be selected as appropriate.) These definitions are made up, for example, of a list of apex coordinate values for the polygon group or groups used (polygon list: these coordinate values are configured of three-dimensional data) a list of polygon surfaces wherein any four points in the apex list are designated by apex number, something that represents standard positions for determining the order in which the polygons are to be displayed, and lists of attributes designating whether one side or both sides of a polygon should be displayed, and polygon surface attributes of elements, etc., that apply two-dimensional pictures (called either "bit map data" or "texture") to the polygons, etc.

The CPU 101, based on data from the ROM 111, performs modeling conversions for arranging these player characters, as solid bodies made up of multiple polygons (being polygons which are mainly tetrahedrons having four apexes, or triangles in which two of the apexes therein coincide), in the three-dimensional coordinate system (world coordinate system). Then the CPU 101 executes perspective conversion based on the point of view, as already discussed, after which it performs three-dimensional clipping.

For this purpose the CPU 101 reads the coordinate value list, polygon surface list, and polygon surface attribute list, etc., as described above, out of the ROM 102. Then the CPU 101 passes these data to the geometalizer. The geometalizer takes the data designated in conversion matrices sent from the CPU 101 and subjects them to a see-through conversion, then executes two-dimensional clipping, and obtains data converted to the visual coordinate system from the world coordinate system in three-dimensional virtual space.

The drawing unit 112 adds texture to the converted shape data in the visual coordinate system, and outputs these to the frame buffer 15. In order to perform this texture addition, the drawing unit 112 is connected to the texture data ROM 113, to the texture map RAM 114, and also to the frame buffer 115.

The terrain data ROM 109 contains relatively roughly (simply) defined shape data such as is sufficient for determining contacts between either vehicles and terrain or between two or more vehicles. The shape of a vehicle is defined here as a rectangle, for example, for the purpose of determining impacts. The data stored in the shape data ROM 111, on the other hand, which pertain to shapes that configure vehicle and background screens, etc., are defined more exactingly.

The scroll data processor 107 processes text characters and other data on the scroll screens. This processor 107 and the frame buffer 115 both lead via the image synthesizer 116 and D/A converter 117 to the TV monitor 13. By these means, the polygon screens (simulation results) of vehicles and terrain (background) temporarily stored in the frame buffer 115, and the scroll screens of textual information such as vehicle speeds and lap times, are combined according to designated priorities, and the final frame image data are generated. These image data are converted by the D/A converter 117 to analog signals and sent to the TV monitor 13, whereupon the driving game images are displayed in real time.

The communications interface 118 supports data communications between the CPU 101 and the other devices. This communications interface 118 comprises converters for converting parallel data on the CPU bus to serial data, or serial data back to parallel data, and a controller for establishing communications protocols.

The input apparatus 11 comprises a steering wheel, accelerator, brake pedal, shifter, and view-change switch, etc., while the output apparatus 12 comprises a steering wheel road-feel feedback mechanism and various lamp indicators, etc. The steering wheel road-feel feedback mechanism imparts prescribed reaction forces to the steering wheel coordinated with vehicle behavior (to be further described below).

The TV monitor 13 displays the driving game images. A projector may be used instead of this TV monitor. The view-change switch is a switch for changing the point of view. By manipulating this switch, a player is provided with a view from the driver's seat or a view of his or her own subject vehicle as viewed diagonally from another viewpoint, for example.

The display unit 15 is connected to the I/O interface 106. During play, this unit displays such play conditions as the lap number for that player, etc. At other times this unit displays a "NO ENTRY" sign indicating that the game is available for play.

The leader marker 16, which is connected to the I/O interface 106, lights when the player operating that game apparatus 10 is running in the lead, and notifies the other players and any spectators of that fact.

Figure 2:
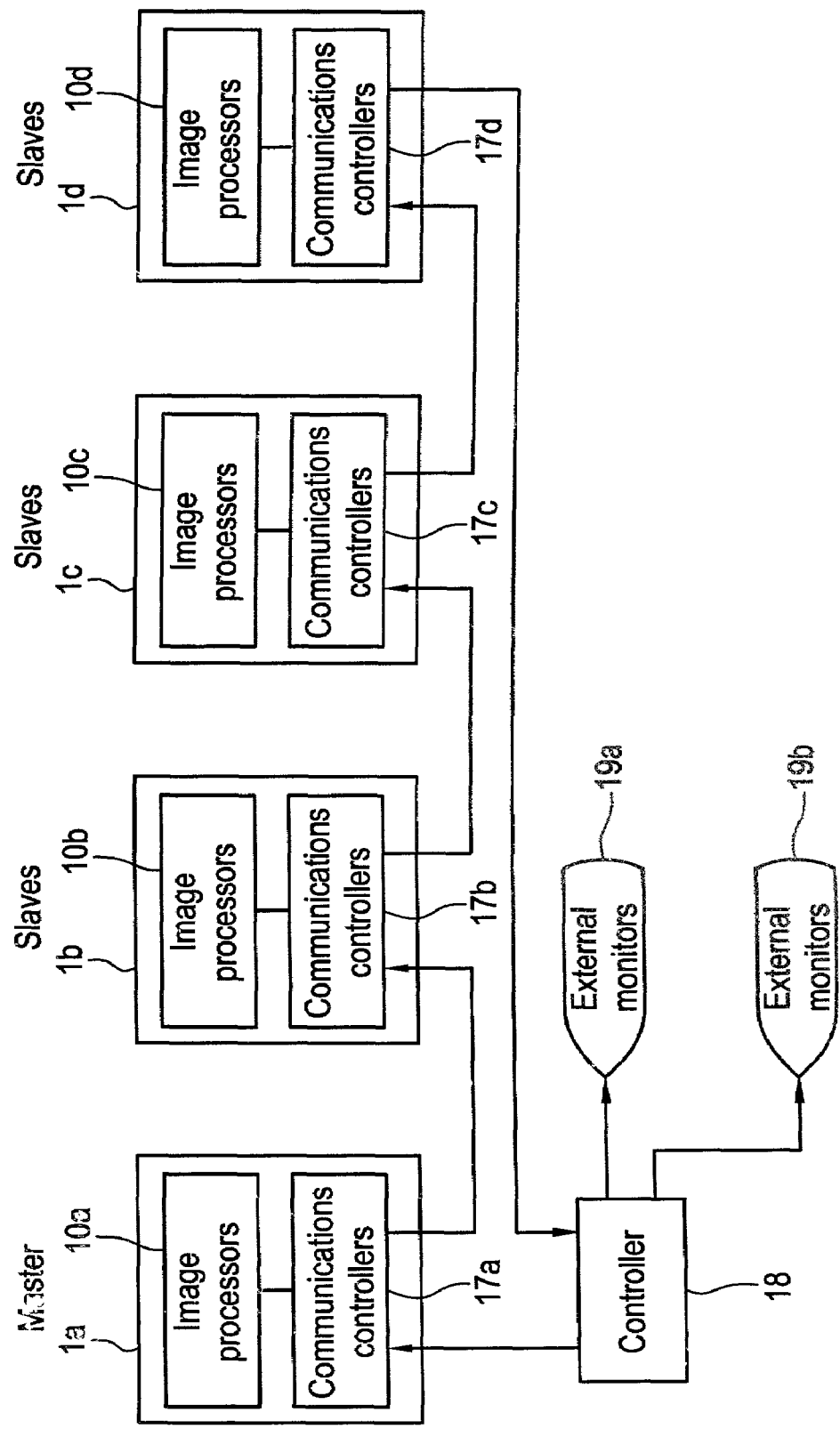
FIG. 2 is a functional block diagram of communicating game apparatuses concerning the first embodiment of the present invention, configured with four of the game apparatuses of FIG. 1.

FIG. 2 diagrams the configuration of communicating game apparatuses comprising a total of 4 game apparatuses, for example. (The total number may be a number other than 4). Four game apparatuses 1a, 1b, 1c, and 1d comprise, respectively, image processors 10a, 10b, 10c, and 10d, and communications controllers 17a, 17b, 17c, and 17d. The communications controllers 17 are connected to the communications interface 118. Each communications controller 17 comprises a plurality of ports that correspond 1-to-1 with the other apparatuses. In the example diagrammed in FIG. 2, each communications controller comprises at least two ports. Or it may be of such a type that multiple other apparatuses can be connected to one port (as in Ethernet applications). Using this system, any one of the game apparatuses 1 can access data (scores, ranks, times, various statuses, etc.) from the other game apparatuses.

In FIG. 2, Game apparatus 1a is the master, while game apparatuses 1b through 1d are slaves. The procedures for communications between these apparatuses will be discussed subsequently. A controller 18 is a single device for making a communications loop between the master and the slaves. The controller 18 takes game screens and race conditions, etc., from the game apparatus 1a, and displays images on external monitors 19a and 19b for the enjoyment of the players and spectators. In this diagram the communications channel is a loop, but is not limited to that configuration, and may be configured as a bus, as noted by the dashed lines in this figure. An Ethernet communications channel may also be used.

Figure 3:
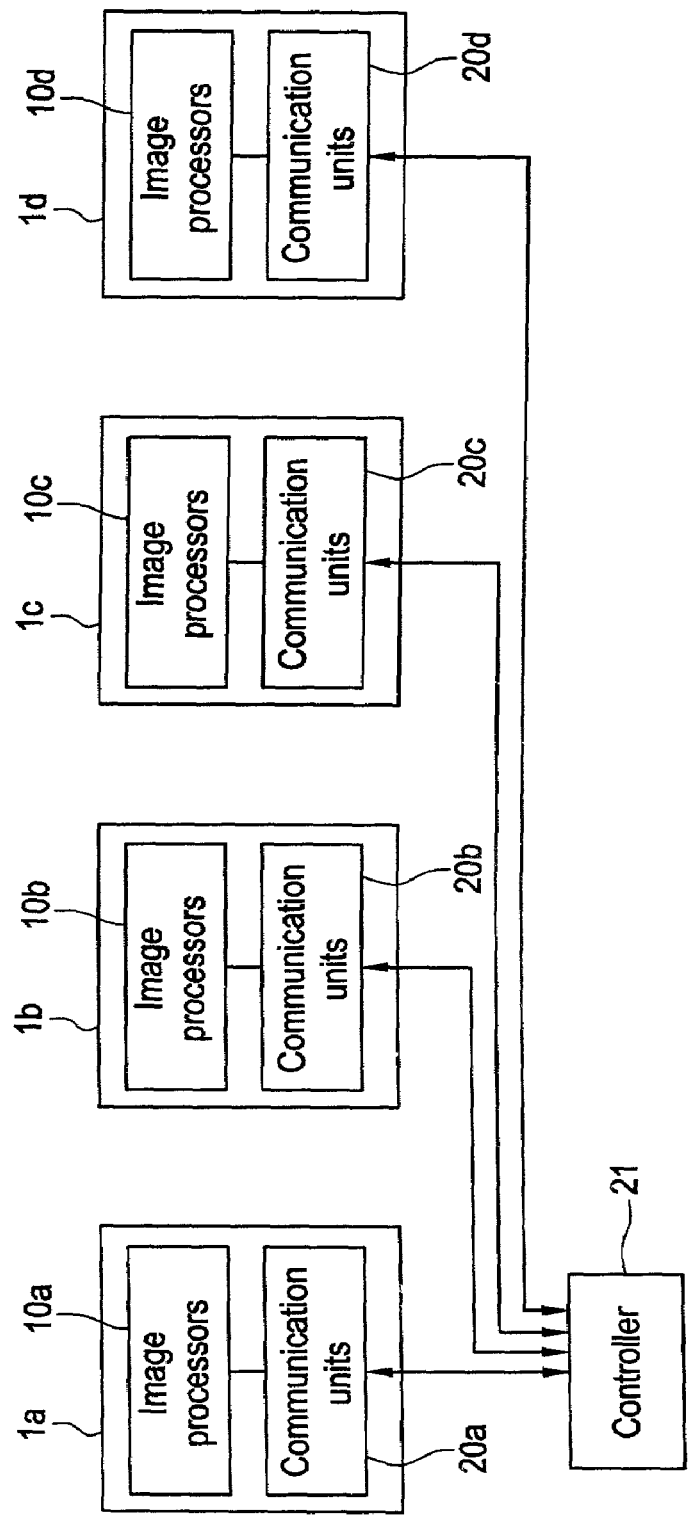
FIG.3 is a functional block diagram of another set of communicating game apparatuses concerning the first embodiment of the present invention.

FIG. 3 diagrams an example configuration that differs from FIG. 2. The communications units 20a, 20b, 20c, and 20d of the game apparatuses 1a, 1b, 1c, and 1d, respectively, are equipped with ports for both transmitting information held in the image processors 10a, 10b, 10c, and 10d to a controller 21, and receiving control information from the controller 21. The controller 21 comprises communications interfaces for the number of game apparatuses, and receives information from all the game apparatuses. It also transmits this information and necessary control information (for turning the displays of other players' vehicles on and off, updating the standings, etc.) to each of the game apparatuses. In the case diagrammed in FIG. 3, the information from game apparatus 1 is first assembled in the controller 21, permitting the configuration of the communications unit 20 of the game apparatus 1 to be kept simple.

Figure 4:
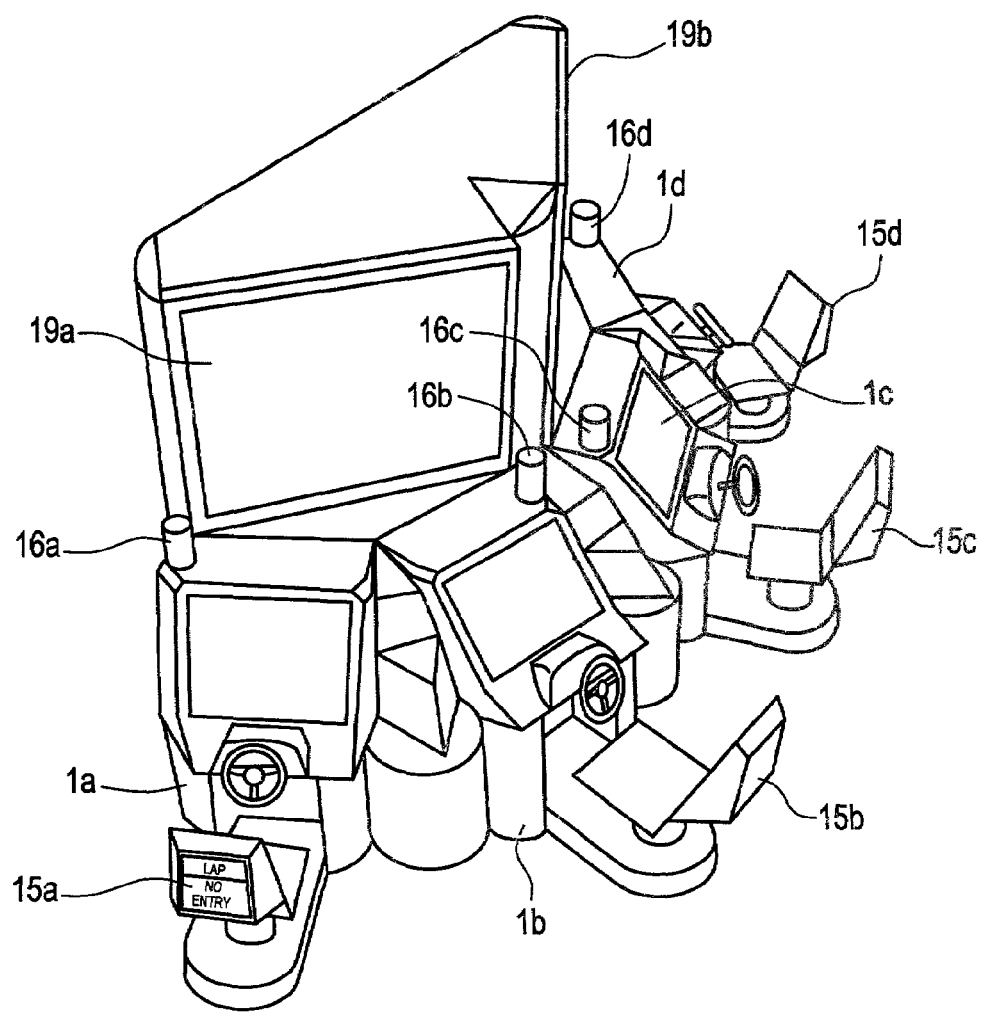
FIG. 4 is an external view of communicating game apparatuses concerning the first embodiment of the present invention.

FIG. 4 provides a diagonal view of the communicating game apparatuses diagrammed in FIG. 2 and 3. The system depicted in this drawing comprises four game apparatuses, but, as noted earlier, the number of game apparatuses may be any number. The game apparatus 1 is made so as to simulate the cockpits of the several cars, each being provided with a TV monitor 1c corresponding to the windshield, a control panel equipped with a steering wheel, and a driver's seat, etc. A leader marker 16 is provided on top of each game apparatus console, and a display unit 15 is attached to the back of each driver's seat. Arranging a plurality of game apparatuses in this manner is convenient for a set of communicating game apparatuses in which one matches one's skill against other players. Two large TV monitors 19 are installed in front of the players so that one may readily apprehend the status of the other players.

Figure 5:
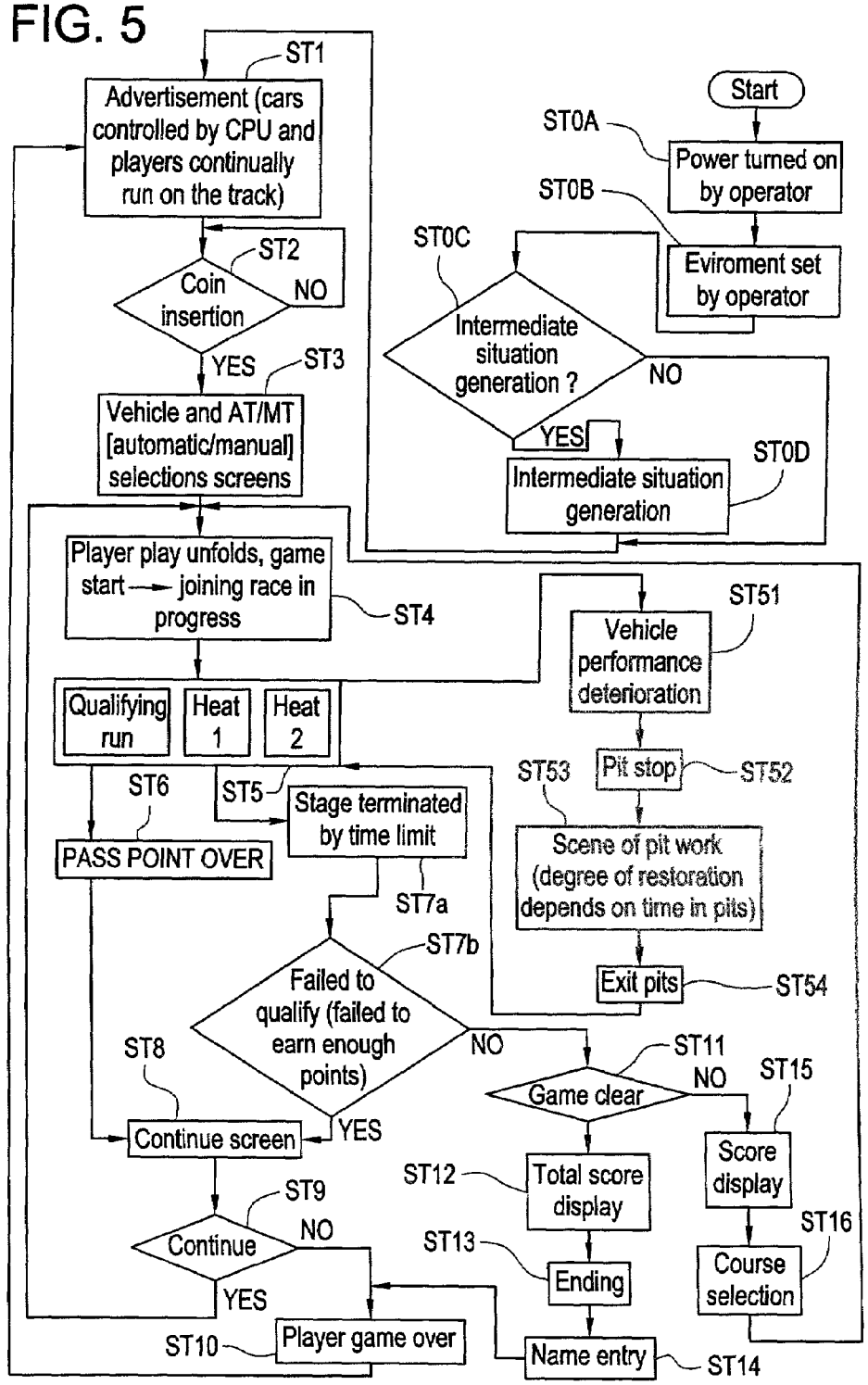
FIG. 5 is a flow chart for the processing in a game apparatus of the first embodiment of the present invention.

FIG. 5 is a flowchart for the race game action of one game apparatus. FIG. 6 through 16 depict example screens for explaining the actions. FIG. 17 is an example plan of a race course for explaining the actions.

The apparatus actions of a first embodiment of the present invention are now described.

Free Entry System Specifics:

One of the characteristics of the apparatus of the first embodiment of the present invention is the "free entry system." This system comprises three features, namely that the vehicles are always deployed in a race irrespective of whether or not players are present (ST 1), that any vehicle running can be selected (ST 3), and that when a player starts a game, he or she joins a race in progress (ST 4). Suppose, for example, that four people first begin play in normal fashion, and then a friend of theirs comes along. That friend can join the game immediately. In this way, if the apparatus of the first embodiment of the present invention is used, an indefinite number of players can play, so that the true role of a communicating game can be fulfilled. The free entry system is now described with reference to FIG. 5.

STO A: Power Turned on by Operator

In order to start up the game system diagrammed in FIG. 1 through 4, an operator first turns the power on to the system.

STO B: Environment Set by Operator

The operator sets the environment for the game (scenario) offered. For example, he or she sets the type of game being offered, whether a race game, a no-time-limit battle game, or a war simulation, etc., and sets various other game parameters, such as the season of the year, the time of day, and the situation, etc. In other words, the individual elements pertaining to the game scenario are not limited to the vehicles or action characters selected by the players, but environmental parameters can also be set.

STO C: Should an Intermediate Situation Be Generated?

The operator decides whether to start the game with everyone at the start line, or to start the game with the race already in progress, and inputs this. In the latter case, an intermediate situation must be set, so the following step STO D is advanced to. If that is not the case, then step ST 1 is advanced to.

STO D: Generate Intermediate Situation

This situation is set up with a race already in progress. Each parameter may be set individually, or a plurality of parameters may be prepared ahead of time (preset).

ST 1: Advertise (Vehicles Operated by the CPU 101 and an Opponent Player Are Continually Engaged in a Race)

Many racing cars are prepared ahead of time and are moving around the prescribed course depicted in FIG. 17. In FIG. 17, 201 is the course, 202 is an area wherein a selected vehicle can be returned to the pits without causing a mishap, 203 is the pit area, and 204 is the grandstand. The vehicles negotiate the course 201 in clockwise fashion. Before play begins, all of these cars are controlled by the CPU 101. In other words, many cars are running, whether play has started or not. This situation simulates an endurance race. The vehicles that the players will use are also running under control of the CPU 101. In step ST 3, described below, the players can select any cars they wish from among the cars running. By having the cars continuously running on the course in this manner, changes will develop in vehicle performance, such as how well the tires are gripping, for example. This change over time in performance is one of the entertaining game features of this embodiment of the present invention. This point is further discussed later on.

ST 2: Coin Insertion

This step determines whether coins have been inserted. If they have been inserted (YES), then step ST 3 is advanced to. Games are started by putting in coins. In the following description, starting or finishing a game refers to the player in view starting or concluding play involving his or her joining a game in progress, and does not refer to the start or finish of the game itself.

ST 3: Vehicle Selection and AT/MT Selection Screens

As noted earlier, the number of vehicles on the course is constant, and the participants select cars they want from among those running. When this is done, all of the action controls of the vehicle selected are transferred to that player, and all actions such as the direction and speed of the vehicle, etc., are performed sequentially according to the directions of the player. One example of this selection process is now described with reference to FIG. 6 through 10.

Figure 6:
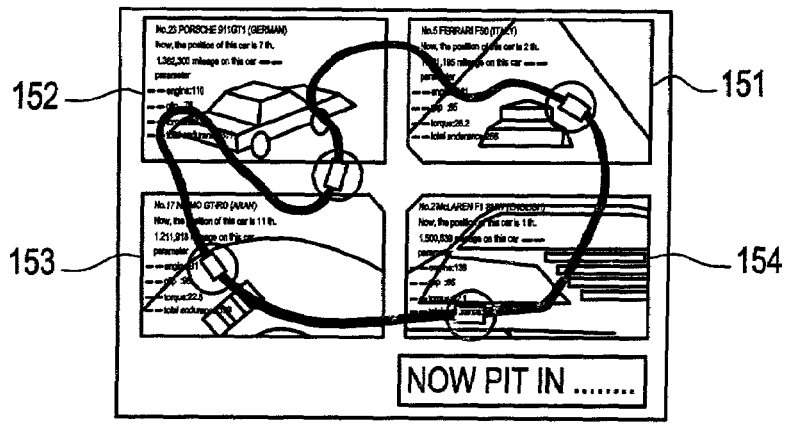
FIG. 6 is a vehicle selection screen for explaining the processing in a game apparatus of the first embodiment of the present invention.
Figure 11:
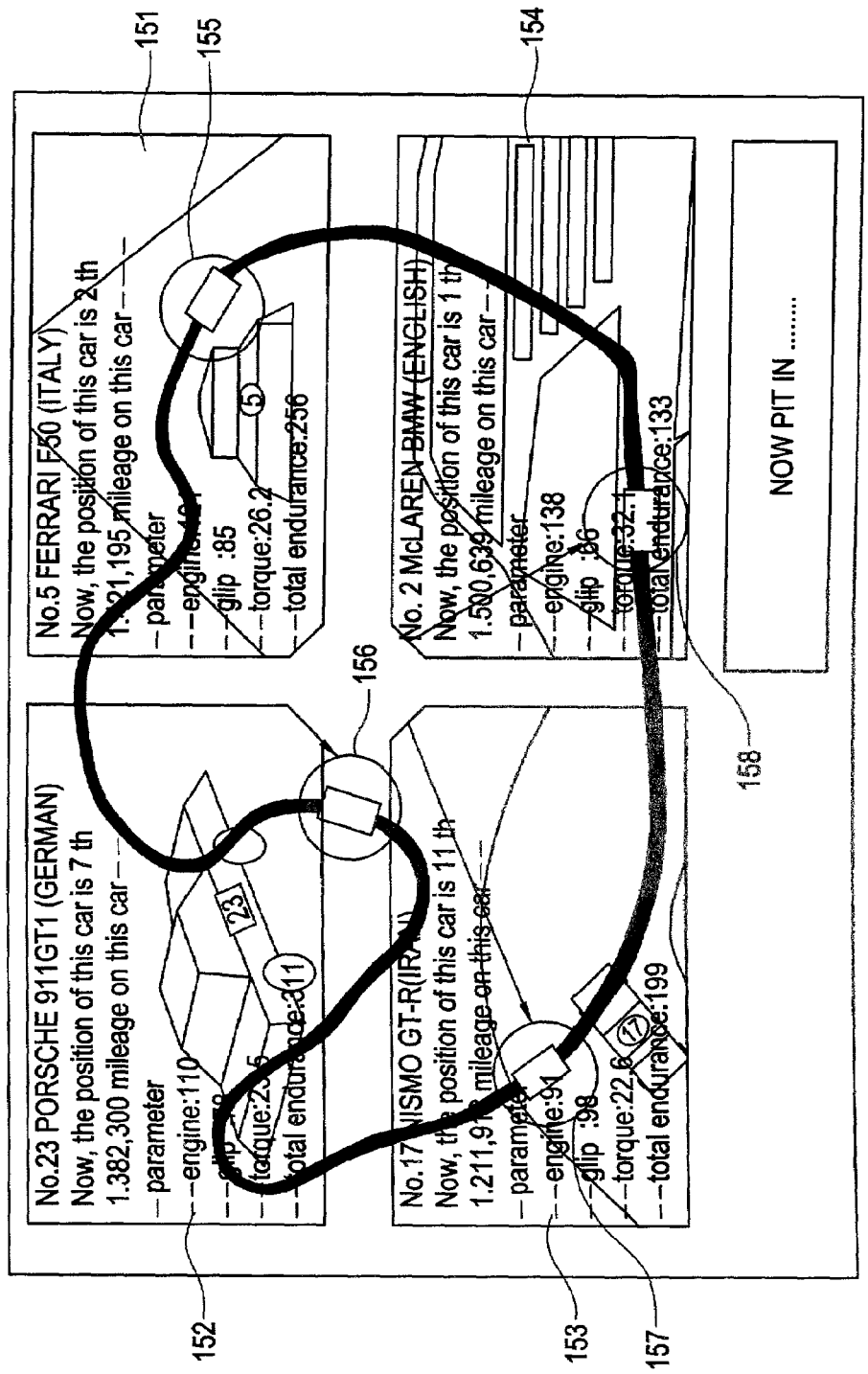
FIG. 11 is a detailed vehicle selection screen for explaining the processing in a game apparatus of the first embodiment of the present invention.

First, the vehicle selection screen depicted in FIG. 6 is displayed. The details of this screen are depicted in FIG. 11. When four vehicles are turning the course, an image of each car, together with a profile including current position, distance run, engine horsepower, tire grip, and previous competition results are displayed on screens 151 through 154. At the same time, the respective positions 155 through 158 of the vehicles on the course are displayed. The players select a vehicle style and profile on the bases of these screens 151 through 154.

A player is free to select any vehicle except one already selected. It should be easy to select a car having an outstanding record, whether or not there are performance differences in terms of game processing.

Figure 7:
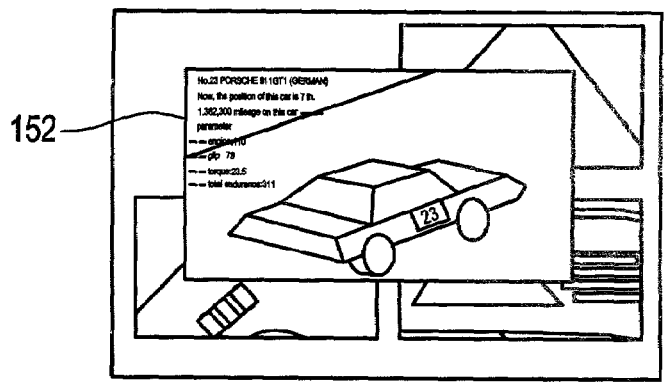
FIG. 7 is a zoom screen for explaining the processing in a game apparatus of the first embodiment of the present invention.
Figure 8:
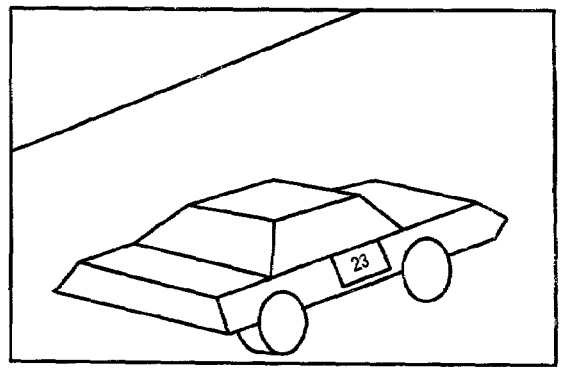
FIG. 8 is a driving screen for explaining the processing in a game apparatus of the first embodiment of the present invention.

When a player selects a car, one of a plurality of screens will zoom out (screen 152 in FIG. 7). Selection is done, for example, using the number of the car displayed on the screen. This selection process is facilitated if the selection number is the same as the number displayed on the body of the car that the player is selecting.

A screen showing that car running is also displayed. The selected vehicle is automatically returned to the pit area 203 in FIG. 17. The player then climbs into the vehicle returned to the pit area 203 and starts racing. In other words, play always begins from the pit exit.

If the car is running in area 202, it can return to the pit area 203 immediately. If it is running outside of that area, however, it may take a little time before it can enter the pit area. As a result, the player will have to wait. In the first embodiment of the present invention, therefore, the CPU 101 executes prescribed processing to return the vehicle more quickly to the pit area. Specifically, the processing methods described below are possible for this purpose.

Method 1: Wait until the selected vehicle returns to the pit area naturally. In this case, it would be good to make the overall course length shorter to shorten the wait time.

Coin insertion→vehicle selection→selected vehicle heads for the pit area from the moment of selection (but does not move backward on the course even if that would be the shorter distance).

Method 2: Create trouble in the selected vehicle to return it to the pit area. The following types of trouble and ways of handling this might be used.
(1) Big crash→after the crash, vehicle moves slowly to the side of the track→vehicle removed by wrecker
(2) Engine trouble→vehicle reduces speed after trouble develops and stops at the side of the track→same as above
Tire blowout →same as above→same as above However, when the selected vehicle is in the area 202 just before the pit area, the player waits for the vehicle to naturally return to the pit area without creating trouble.

ST 4: Player Begins Play, Game Starts →Race Joined in Progress

A player exits the pit area 203 onto the course 201 and begins racing by merging with the many vehicles under the control of other players or the CPU 101.

Figure 9:
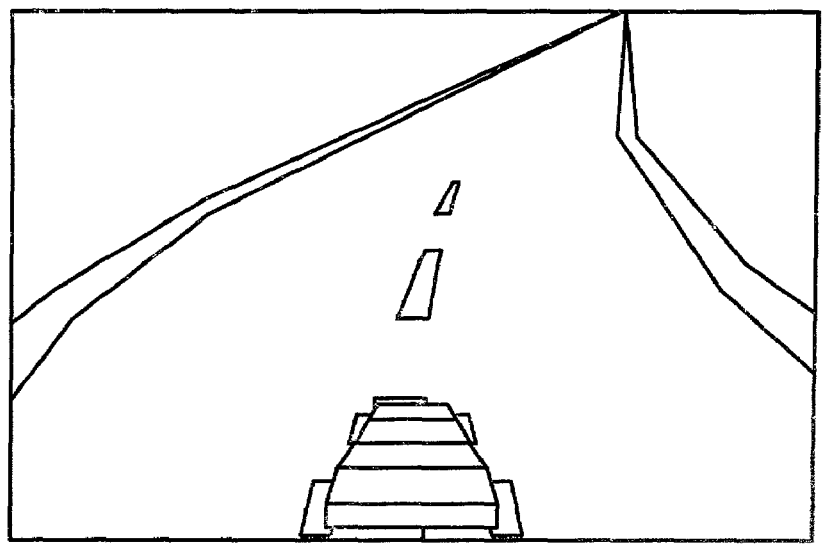
FIG. 9 is a diagram depicting a camera perspective in a game for explaining the processing in a game apparatus of the first embodiment of the present invention.
Figure 10:
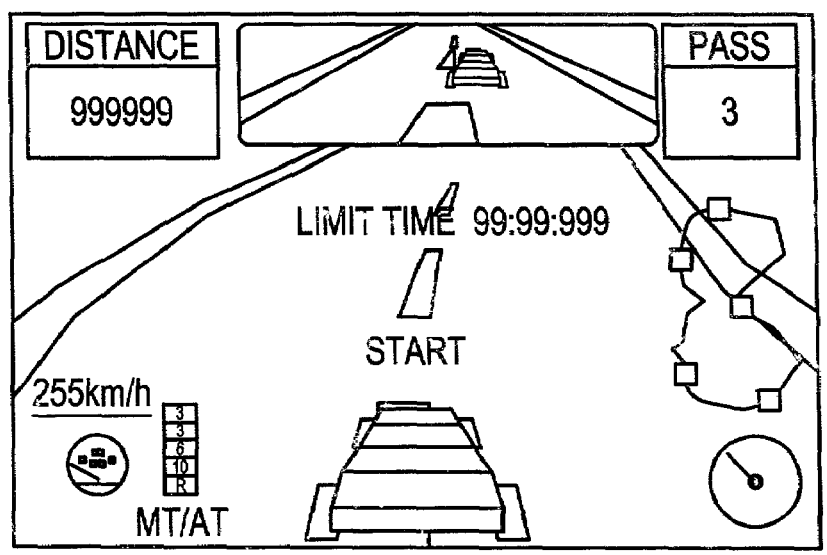
FIG. 10 is a start screen for explaining the processing in a game apparatus of the first embodiment of the present invention.
Figure 12:
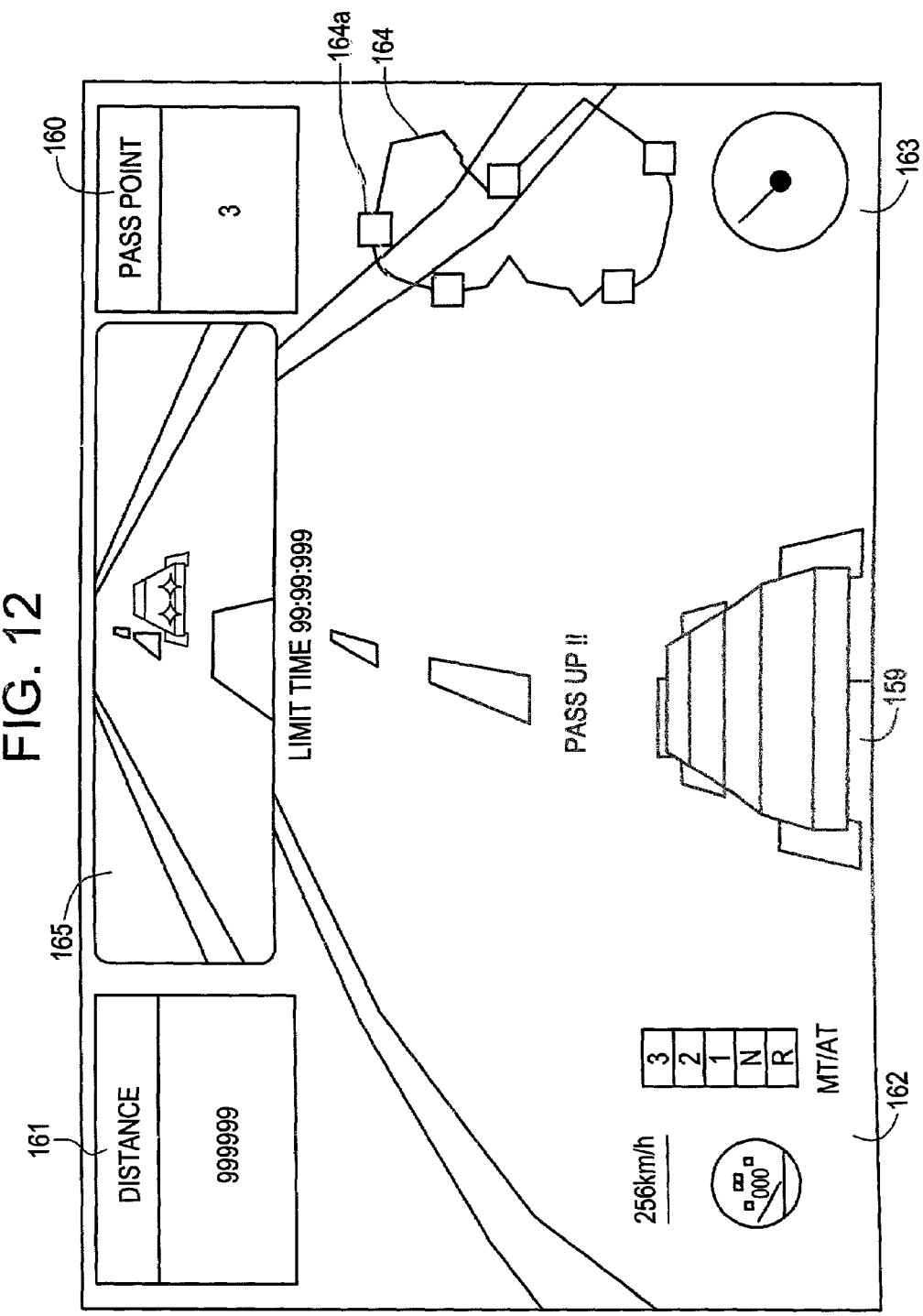
FIG. 12 is a race screen for explaining the processing in a game apparatus of the first embodiment of the present invention.

When a player comes into the pit area 203, the display screen will display the course ahead, as depicted in FIG. 9, and this will change to a start screen such as seen in FIG. 10. The details of this screen in FIG. 10 are shown in FIG. 12. In FIG. 12, 159 is the selected play vehicle, 160 is the pass count display (pass count is discussed subsequently), 161 is the distance run display, 162 is the speedometer, tachometer, manual/automatic display, and gear position display, 163 is the damage meter which indicates the degree of damage sustained by the vehicle, 164 is the display of the overall course, 164*a* is the position display for opponent vehicles, and 165 is the rearview mirror. There are also a display of the limit time "LIMIT TIME 99:99:99," and a pass-count status-change display such as "PASS UP!!." The latter also displays such messages as "PASS DOWN!!" and "Challenger Is Coming."

ST 5: Start Race (Qualifying, Heat 1, Heat 2)

The race is started. In the race, while sustaining an ordinary standing system at the beginning, each player also has a time. A player joining a race in progress joins from the pit exit road (i.e. starts from the pit area). A degree of skill is required to negotiate this pit exit road. Hence, if a player can safely negotiate the pit exit road and enter the main track, this constitutes a front-group entry, whereas the failure to do so results in a back-group entry. In other words, the standing of a player is determined immediately upon his or her entry into the race according to his or her skill level. Also, bonus time is added at each check point. A player need not forfeit an earned standing when the game is over, but, by continuing, can resume the game maintaining the same position. However, he or she must be careful lest he or she be passed from behind by a competitor while he or she is deciding whether or not to continue playing. Also, unless a player exercises great care when merging onto the track from the start line, he or she may be struck from behind by another car. Conversely, when a player is going to continue playing, a following competitor has a good chance to catch and pass that player.

ST 51: Vehicle Performance Degradation

As the laps begin to add up, race performance (i.e. engine and tire performance) begins to decline. A pit stop is necessary in order to restore race performance to what it was originally.

ST 52: Pit Stop

A player enters the pit area by performing prescribed maneuvers. Before entering the pit area, however, a certain number of laps must be completed.

ST 53: Pit Work Scene (Amount of Restoration Depends on Pit Time)

Figure 13:
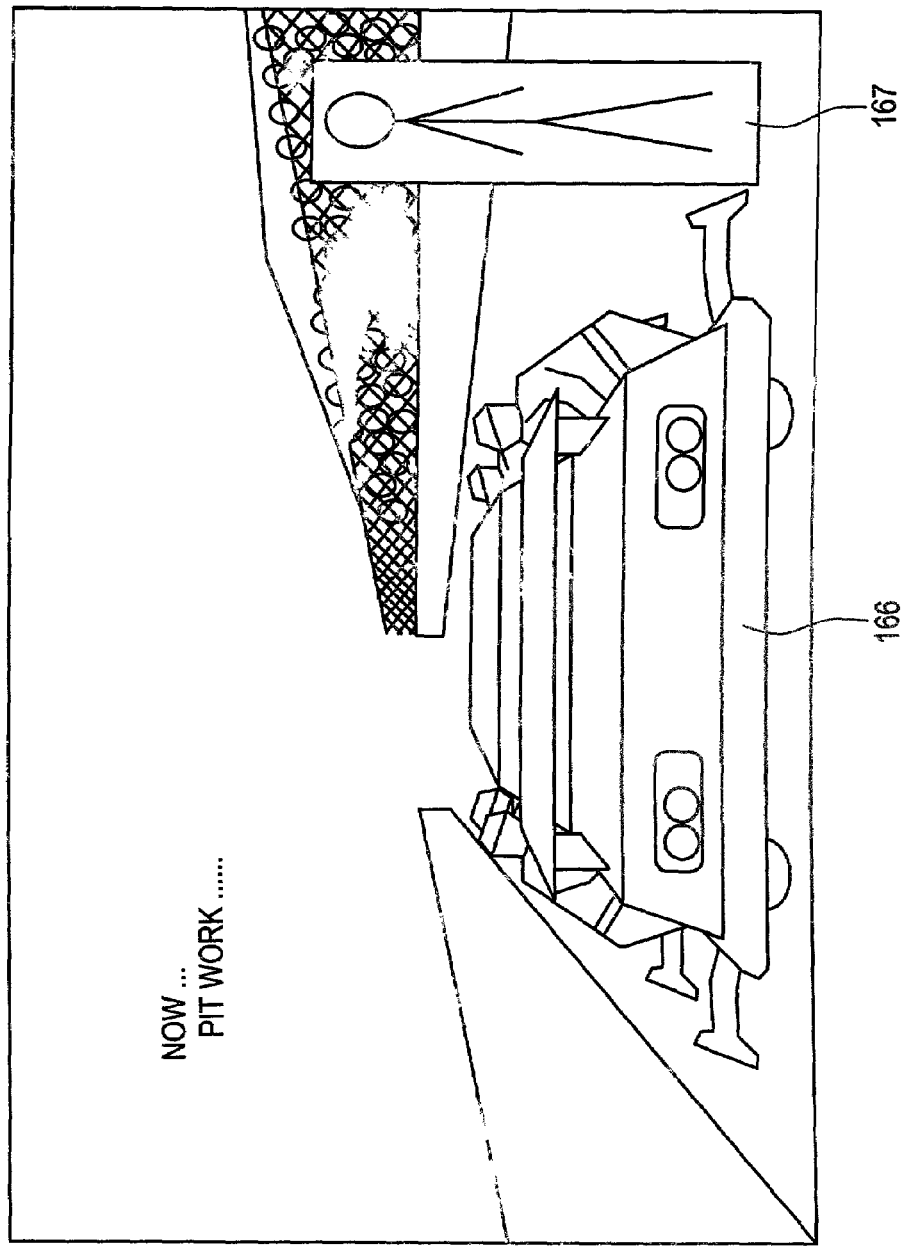
FIG. 13 is a pit-stop screen for explaining the processing in a game apparatus of the first embodiment of the present invention.

While a vehicle is being worked on in the pit area, a screen such as that depicted in FIG. 13, for example, is displayed. The pit crew gathers around the vehicle 166 to change the tires and replenish the fuel. During this pit time, a so-called race queen (i.e. a beautiful woman) may be displayed, as indicated at 167 in FIG. 13, to enhance the entertainment value of the game screen.

The work in the pit area takes some time to accomplish. A player can select what repairs are made, that is, whether or not to change the tires, whether to simply take on more fuel, etc. By reducing the number of repair items, the time required for the pit work can be regulated as appropriate. This changes the restoration state of the vehicle. Thus pit strategy can be developed according to a player's skill or the performance of the other cars. If the player is confident in his or her ability to drive fast, he or she can choose to have everything repaired; if not, he or she can have only the engine or steering or some other critical component repaired. Since some time is required for the pit stop, it is also possible to change players during this interval. Thus the interest level of the game is increased by incorporating pit operations into the race strategy.

ST 54: Leaving Pit Area

When the pit work is complete, the player merges back onto the track 201 and begins racing again. The merge point is always the same, and this is the starting line for the course. Since cars under CPU control are continually on the course, when there are no players participating, the race is between CPU competitors.

This game terminates either when the pass points are used up, or when the stage terminates due to the time limit.

ST 6: Pass Points Exceeded (PASS POINT OVER)

Figure 14:
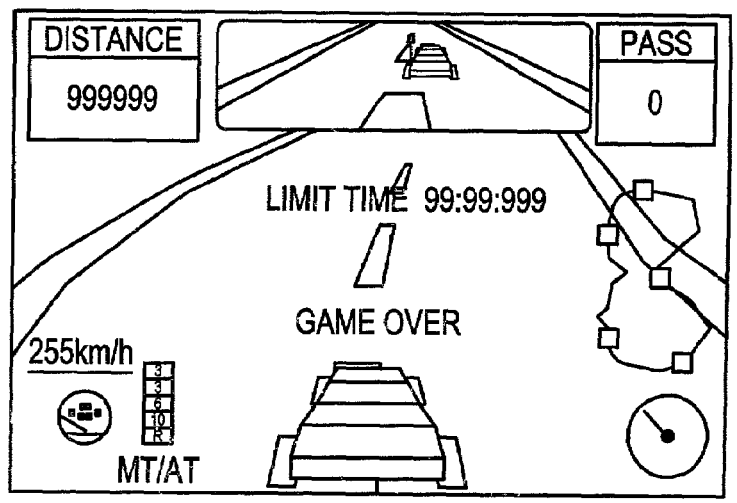
FIG. 14 is a game-over screen for explaining the processing in a game apparatus of the first embodiment of the present invention.
Figure 15:
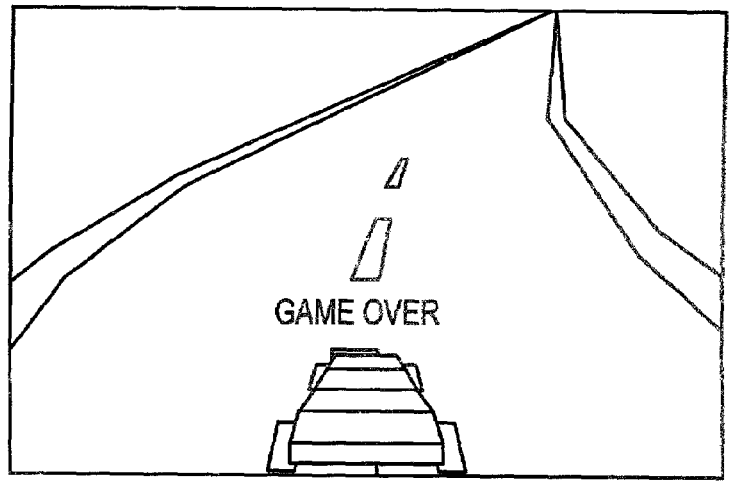
FIG. 15 is a game-over screen for explaining the processing in a game apparatus of the first embodiment of the present invention.

When the pass points have been exceeded, a display of "GAME OVER" is made, in step ST 6, as depicted in FIG. 14. As soon as "game over" is displayed, the CPU 101 takes over control of that car. And, as depicted in FIG. 15, all screen displays of distance run and PASS points, etc., disappear.

The method of computing pass points is discussed subsequently.

ST 7*a*: Stage Termination Due to Time Limit

When a predetermined time limit has been exceeded, in step ST 7*a*, "GAME OVER" is displayed, as depicted in FIG. 14. For example, the number of laps that must be completed within a certain time period is predetermined, and, if that number of laps has not been completed when the limit time elapses, the game is terminated. Or the game may be forced to terminate simply when the limit time has elapsed. The lap limit is set to the number of laps that a player of normal skill can complete. Then step ST 7 is advanced to.

ST 7*b*: Determination of Qualification (Were the Required Points Acquired?)

This step determines whether the required number of laps, as noted above, was completed. If the player has failed to qualify (YES), step ST 8 is advanced to. If the player has successfully qualified (NO), step ST 11 is advanced to.

ST 8: Display Continue Screen

Figure 16:
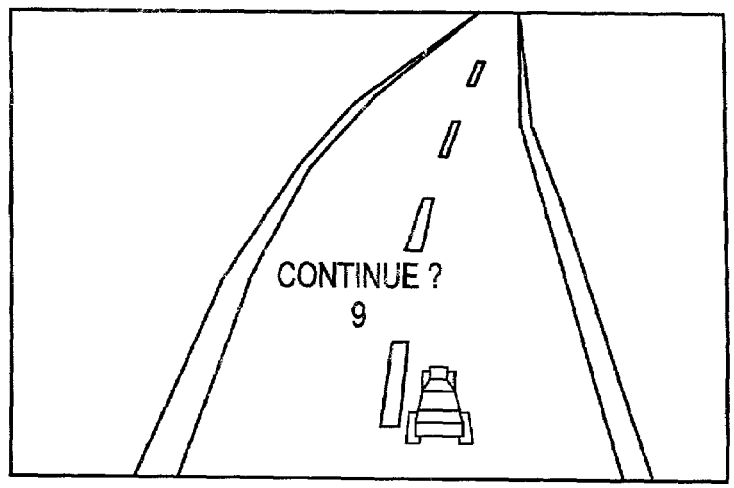
FIG. 16 is a continue screen for explaining the processing in a game apparatus of the first embodiment of the present invention.
Figure 17:
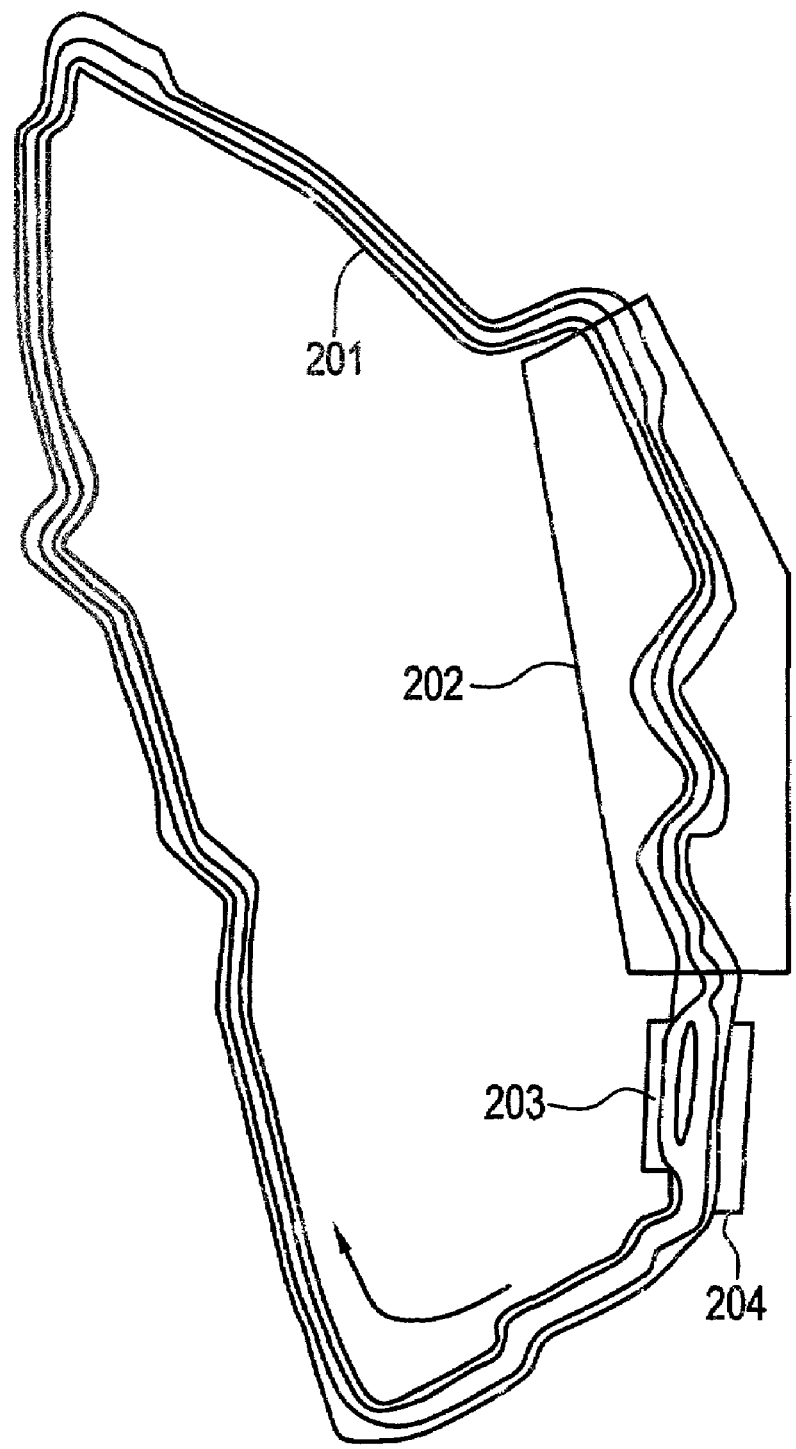
FIG. 17 is a course plan for explaining the processing in a game apparatus of the first embodiment of the present invention.

A continue screen such as depicted in FIG. 16, in which the camera zooms out, is displayed.

ST 9: Decide Whether to Continue or Not

In the continue screen in FIG. 16, a countdown is conducted, from 9 to 0, while displaying the number on the screen. If a coin is inserted before the count reaches 0, the determination is to continue (YES). If no coin is inserted before 0 is reached, the determination is not to continue (NO).

If the determination is to continue (YES), then step ST 4 is returned to, and the game is resumed. In that case, the screen perspective will zoom up from the continue screen depicted in FIG. 16, and transition to the start screen.

When a coin has been inserted beforehand, the race can be continued at the current position and speed, without any speed reduction or interruption. The faster coins are inserted, the more advantageously can the race be continued.

When the determination is not to continue (NO), step ST 10 is advanced to. When no coin has been inserted, the engine stops and the vehicle naturally slows down.

ST 10: Termination of Game by Player

Until the game starts, the advertisement screen display (ST 1), which is a demonstration screen, is returned to.

ST 11: Decision on Clearing Game

When the limit time has fully elapsed, if the player has successfully qualified, this step determines whether or not to clear the game. When a prescribed number of laps has been completed, the determination is made to clear the game (YES) and step ST 12 is advanced to.

When the game is not cleared (NO), step ST 15 is advanced to.

ST 12: Total Score Display

The present player's total score is displayed in addition to the score of the player who previously cleared the game in this game apparatus.

ST 13: Ending

An ending screen is displayed, such as one of an award ceremony where the victor is honored.

ST 14: Name Entry

A screen is displayed urging this player to enter his or her name. The name entered is stored in the RAM 103, and displayed together with other players having outstanding scores in the total score display screen of ST 12.

ST 15: Score Display

The qualifying score for this player is displayed.

ST 16: Course Selection

The next course to be played is selected here in order to continue the game. Only players who have successfully qualified can select the final event.

In the foregoing, the overall action of this game apparatus has been described. As explained at the outset, one of the features of the apparatus of this first embodiment of the present invention is the ability of any player to join in the play at any time. For that reason, unlike conventional games wherein all of the competing cars start the race together with the subject car, with the apparatus of the first embodiment of the present invention, the cars participating in the race have already started, and players select the cars they want from among those cars on the track. Thus the game is continued irrespective of whether players are present or not, so the game is continually advancing. Players can join the game whenever they so desire, in a variety of situations, and the spectators always have a new situation to watch. Accordingly, compared to a conventional game, both players and spectators can have more fun with this game.

Now, in the initial state when the power is turned on, the other vehicles (competitors) will be positioned randomly around the track, and the situation will not necessarily be right after a start. Joining a race in progress (free entry) immediately after a start is difficult, and it may not be possible to maintain fairness with players starting later (when free entry will be easier because the vehicles will be spread out). Accordingly, when action is first started, the positions of the vehicles might be spread out (randomly) by computation. This condition could be set by a distributor (or operator) as part of a customer soliciting strategy.

Pass Count System Details

Figure 18:
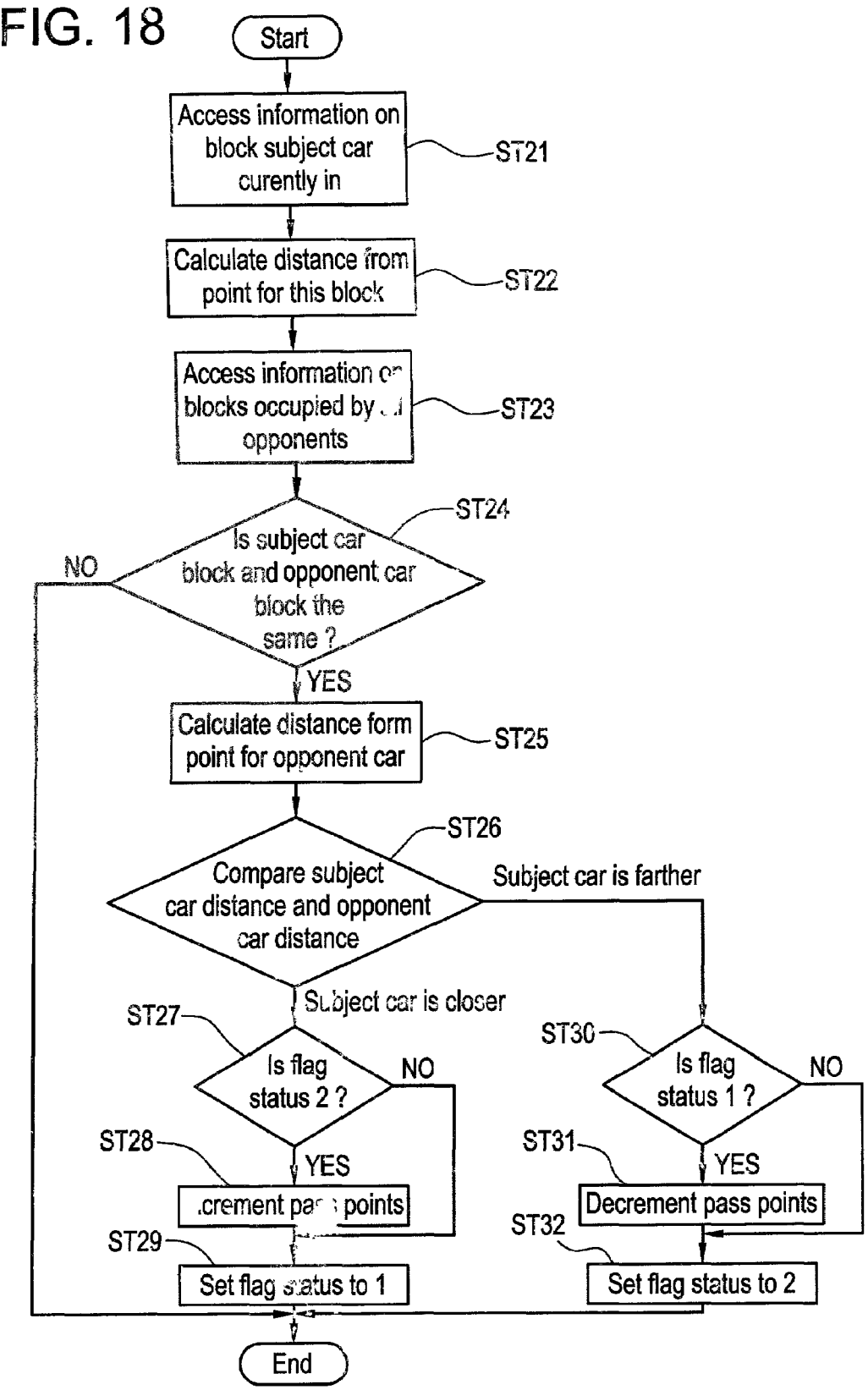
FIG. 18 is a flowchart for pass-count processing in a game apparatus of the first embodiment of the present invention.

A pass count system that is a suitable method of deciding victory and defeat for the free entry system is now described with reference to FIGS. 18 through 20.

In the free entry system, there are no simultaneous starts as in conventional games, so the method of terminating games by regulating the run time (time expiration system) cannot be used. This being so, the method used (pass point system) is to terminate a game on the basis of points scored by passing or being passed.

ST 21: Access information on block vehicle is now in.

Figure 19:
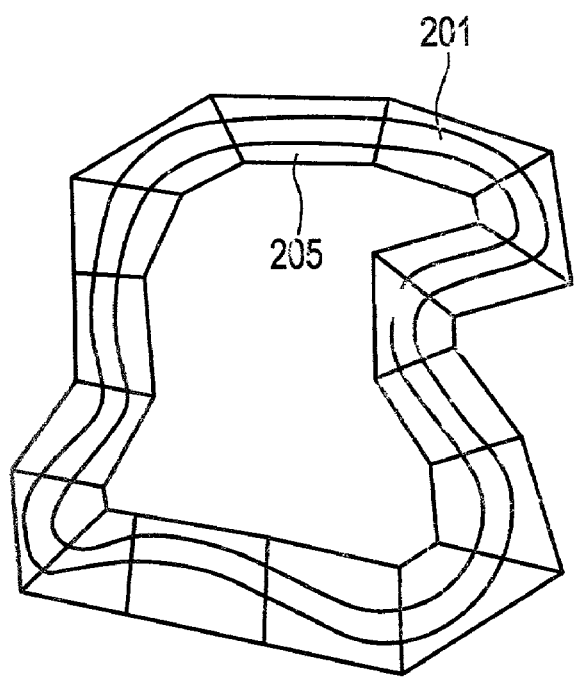
FIG. 19 is course plan for explaining pass-count processing in a game apparatus of the first embodiment of the present invention.

As diagrammed in FIG. 19, the circuit course 201 is divided into a number of blocks 205. Pass counts are calculated in each of these blocks, respectively. Each block 205, as depicted in FIG. 20, has a prescribed point 206. With reference to this point 206, distances x and y to the subject vehicle 207 and opponent vehicle 208 are found. Then the pass points are computed on the basis of these distances x and y. The point 206 in FIG. 20 is shown ahead of the driver on the track, but it may be some other location, such as on the track behind the driver or even off the track. Nor is this determination limited to a flat plane. The reference point need only be at some specified location either in the plane of the vehicles 207 and 208 on the course, or in space.

The CPU 101 selects the block 205 that the subject vehicle 207 is in, and obtains information therefrom (on positions, course shape, etc.).

ST 22: Calculate the Distance from the Point for That Block.

Figure 20:
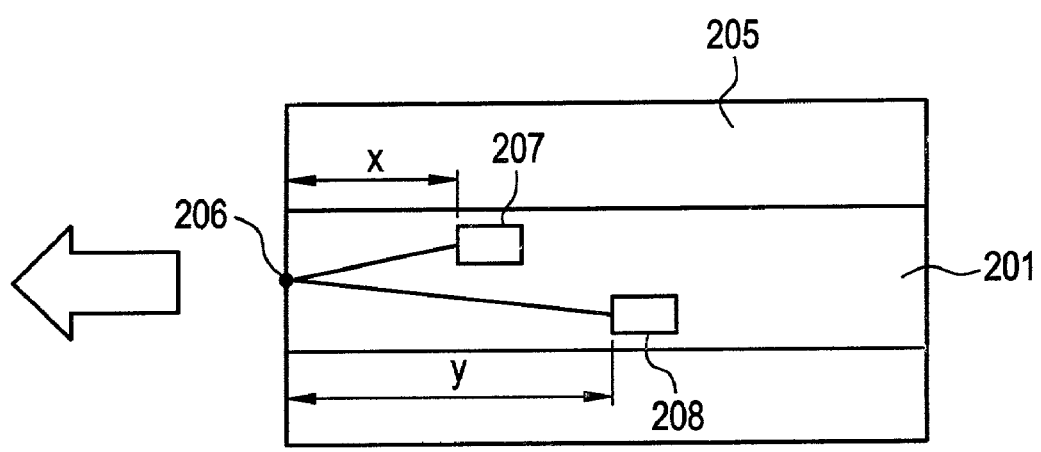
FIG. 20 is a block plan for explaining pass-count processing in a game apparatus of the first embodiment of the present invention.

This step finds the distance x in FIG. 20. The CPU 101 can readily learn the coordinates of each vehicle. It then finds the distance based on those coordinates. If the track is straight in that block, then the situation is as diagrammed in FIG. 20. If the track is curved, then the distance is found based on the shape of the curve (i.e., the distance along the centerline, for example).

ST 23: Access information from all opponent-occupied blocks.

This step accesses information on where all of the opponent vehicles are on the track. This game apparatus is a communicating apparatus, so the CPU 101 in every game apparatus is able to access information on all vehicles.

ST 24: Determine Whether Subject Vehicle Block is the Same as the Opponent Vehicle Block.

If the subject vehicle 207 and opponent vehicle 208 are both in the same block (YES) in FIG. 20, then the next step ST 25 is advanced to and pass point processing is executed. If the blocks are not the same (NO), then the subject vehicle will not be passed by the opponent vehicle, and there will be no change in the pass points, so pass point processing will terminate.

ST 25: Calculate Distance from Point for Opponent Vehicle Block.

This step finds the distance y in FIG. 20.

ST 26: Compare Subject Vehicle Distance and Opponent Vehicle Distance.

When the subject vehicle is closer to the point than the opponent vehicle, that is, when x<y in FIG. 20, step ST 27 is advanced to.

Conversely, if the subject vehicle is farther, that is, if x>y, then step ST 30 is advanced to.

ST 27: Examine Flag Status to Check for a "2."

When the flag status is "2, " indicating that the subject vehicle was farther from the point in the preceding routine (YES), step ST 28 is advanced to.

If that is not the case (NO), then there is no change in the situation of the subject vehicle being farther, either in the previous routine or in this routine, so there is no need to change the pass points. Step ST 28 is skipped and step ST 29 is advanced to.

ST 28: Increment Pass Points (+1).

In the previous routine, the subject vehicle was the more distant (x>y), but in this routine the subject vehicle is closer (x<y). This means that in the interval between these two routines (1/60 second, for example), the subject vehicle 207 overtook the opponent vehicle 208. Hence the pass points are incremented to show that "1 opponent was overtaken."

ST 29: Set Flag Status to "1."

Unlike the situation in the previous routine, here the subject vehicle 207 has drawn near to the point 206, so the flag status is set to "1" to indicate this. This terminates the pass point processing.

ST 30: Examine Flag Status to Check for a "1."

When this flag is a "1, " indicating that the subject vehicle was closer in the previous routine (YES), step ST 31 is advanced to.

When that is not the case (NO), there has been no change in the situation of the subject vehicle being more distant, either in the previous routine or in this routine, so there is no need to change the pass points. Step ST 31 is bypassed and step ST 32 is advanced to.

ST 31: Decrement Pass Points (−1).

In the previous routine, the subject vehicle was the nearer (x<y), but in this routine the subject vehicle is more distant (x>y) . This means that in the interval between these two routines (1/60 second, for example), the subject vehicle 207 has been overtaken by the opponent vehicle 208. Thereupon the pass points are decremented.

ST 32: Set Flag Status to "2."

Unlike in the previous routine, now the subject vehicle 207 has become more distant from the point 206, so the flag status is set to "2" to indicate this, and the pass point processing is terminated.

As described in the foregoing, then, the "pass count" is incremented (+1) if an opponent vehicle ahead is overtaken, and decremented (−1) if the subject vehicle is overtaken by an opponent vehicle from behind. Thus the pass count system numerically quantifies the situation between multiple vehicles where cars are continually overtaking and being overtaken.

As explained earlier, when the pass count becomes zero, the continue screen is displayed (cf. FIG. 5 and ST 6 and 8), so, to make the game more interesting, the default "pass count" is set to some value greater than 1 (say to 3, for example) immediately after the game starts.

The "pass count" is displayed on the screen. The number of cars overtaken and the current standing are also displayed. The "pass count" continues to be calculated while the car is in the pits. Accordingly, it is possible for a game to finish while one is sitting in the pit area. Thus it is necessary to judge whether or not it is advisable to make a pit stop. This provides an element of strategy not available in conventional games, and gives players something different to enjoy.

Instead of basing the count on "overtaking" and "being overtaken, " moreover, it may be based on "crashing into the wall, " or some other factor.

Benefits of Free Entry and Pass Count Systems

As described in the foregoing, with this system a player can join the game at any time. Thus entry is possible even when a game is in progress, after it has started. Hence a driving game is provided wherewith players can match driving technique and racing tactics with each other, and wherewith "battles" can take place with unknown players just as in a battle game. Thus there is a good probability that a player—not being limited to contests with his or her buddies—can compete against completely unknown opponents. Also, the game can be kept running continually without interruption (so that one never has to wait before joining in).

The apparatus of the first embodiment of the present invention, moreover, is not limited to driving games, but may be applied to airplane games or other race games. This permits free-entry contests without the annoyance of having to wait to join a game or the awkwardness of standing around idly with unfamiliar people.

Setting Environmental Conditions

In the free-entry system, all of the vehicles are continually on the track, and races can be joined when cars are in the pit area, for example. Thus, as in an actual endurance race, the environment and the condition of the cars can be changed with the passage of time, permitting a more realistic game to be presented. In the conventional system wherein all cars start simultaneously, the elapsed times are short, making it difficult to offer such changes in the environment. The specific conditions which may be changed are as follows.

(1) Change weather conditions such as temperature, humidity, and precipitation (rain start and stop) by a calendar or timer, and reflect the effects of these changes on vehicle performance. Or, preset the seasons and have the distributor make the selections.

(2) When a crash occurs, have debris scattered about, altering the track conditions, and affecting vehicle performance. The track conditions are also changed by the running of cars under CPU control. If one wishes to run on a clean track surface, one should begin playing the first thing in the morning. As time passes, tire grip increases. The specifics of these conditions and processing are as follows.

(2-1) Changes in Track Surface as Race Progresses
   Track temperature
   Track surface conditions (dry, wet, rain falling, standing water on surface, snow falling, snow accumulating, ice-burned condition, oil on track, sand on track, tire marks on track)
   Change in weather (clear, rain, snow, cloudy, sleet, hail, fog)
   Change in wind conditions (change in wind direction and strength, combinations with other weather conditions)
   Change in outside environment (temperature, humidity, atmospheric pressure)

(2-2) Effects of Changing Conditions
   Track temperature
Change the resistance coefficient between tires and track surface
Increase rate of tire wear, etc.
   Track surface conditions
Change resistance coefficient of tires individually
Increase rate of tire wear
Change air resistance
Change visibility, etc.
   Weather Changes
Change air resistance
Change air density
Change atmospheric pressure
Change aerodynamic resistance (CD=coefficient of drag)
Change down-forces, etc.
   Changes in External Environment {Temperature}
Temperatures rise for all materials
Durability and wear rates change depending on the types and parts of such materials used {Atmospheric pressure}
Air resistance and down-forces change; all physical quantities involving weight change {Temperature}
All physical quantities involving friction change
Example: Resistance and Young's modulus in break pads change, etc.

(3) Parameters Changeable by Game Machine Operator
The specifics of the conditions and processing are as follows.
   Degree of difficulty of game (change vehicle performance; change opponent AI)
   Enable/disable exterior environmental changes
   Enable/disable weather changes
   Enable/disable seasonal changes
   Regulate wear rates
   Adjust time per day (12 min /24 min /6 min, etc.)
   Default course selection
   Enable/disable game termination by lap count
   Step-up conditions (conditions for advancing to next course)

Distributed Processing

In the apparatus of the first embodiment of the present invention, a plurality of game machines are connected, comprising a communicating type game apparatus featuring distributed processing between the game machines. If there are 90 vehicles, for example, 30 will be processed by game machine A, 30 by B, and 30 by C.

Figure 21:
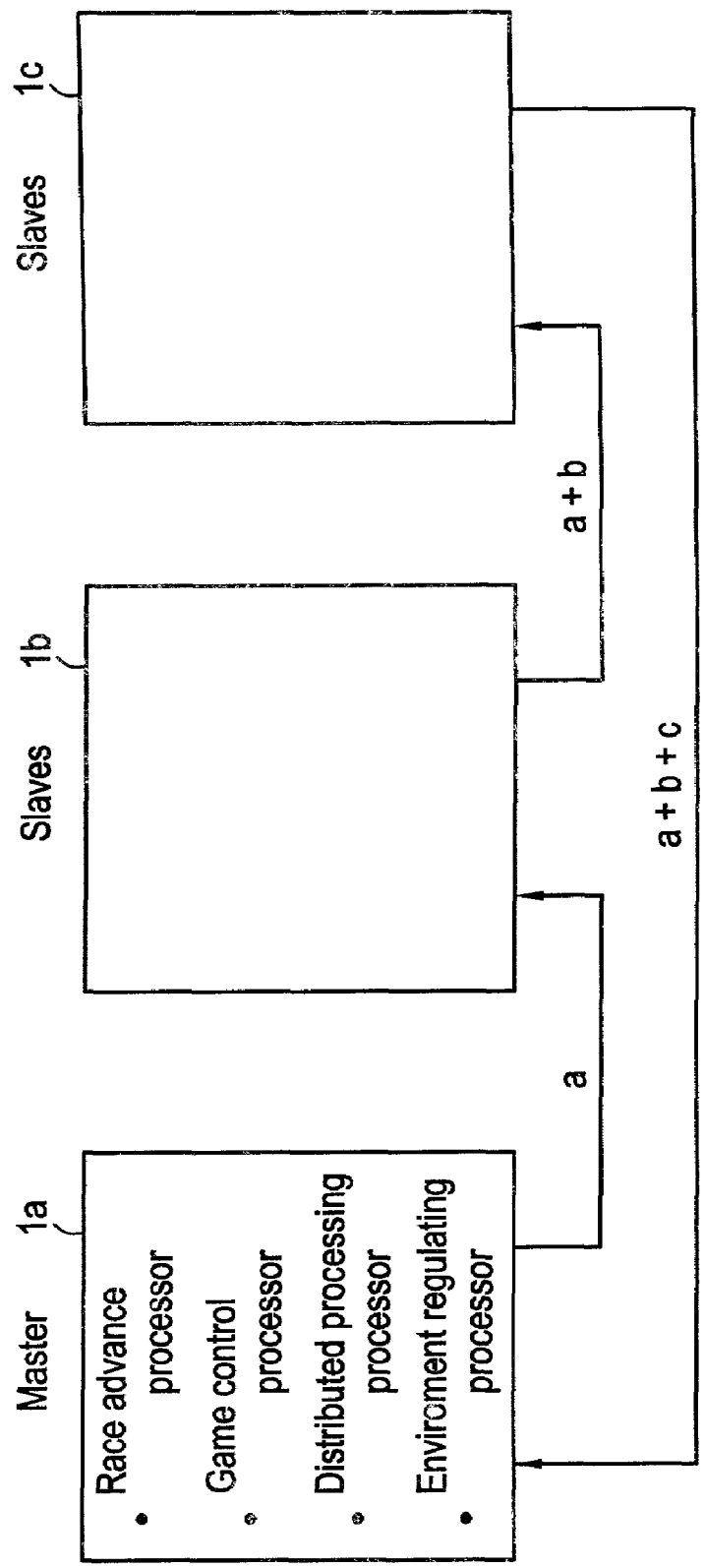
FIG. 21 is an explanatory diagram of distributed processing in a game apparatus of the first embodiment of the present invention.

The distributed processing in the first embodiment of the present invention is now described with reference to FIG. 21 and 22. In FIG. 21, three game machines 1a, 1b, and 1c are connected. Game machine 1, the master game machine, determines the distribution of the processing load and controls the distributed processing overall. Game machines 1b and 1c are slave game machines. Game machine 1a sends data a to game machine 1b. Game machine 1b sends data a together with data b that it has processed itself on to game machine 1c. Game machine 1c sends data a+b together with data c that it has processed itself to game machine 1a. In this manner, game machine 1a can access data b and c that have been processed by the other game machines 1b and 1c. The same is true for these other game machines 1b and 1c. Thus, by circulating the data around the loop, processing is distributed among the game machines 1a, 1b, and 1c, while every game machine has access to all data.

Figure 22:
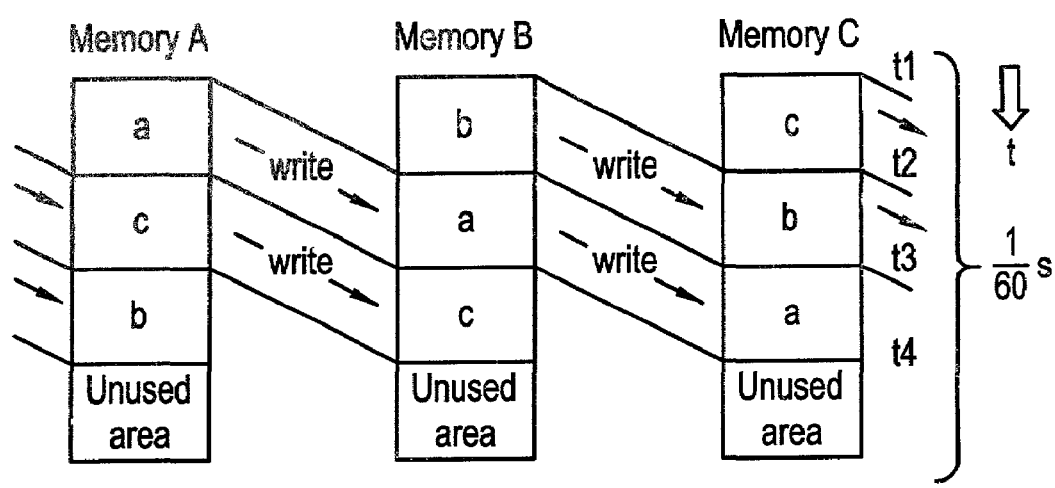
FIG. 22 is an explanatory diagram of distributed processing in a game apparatus of the first embodiment of the present invention.

Process timing is now described making reference to FIG. 22. In FIG. 22, memories A, B, and C represent the memories in the game machines 1a, 1b, and 1c, respectively. The arrows represent the writing of data, with the flow thereof being from up to down. Between times t1 and t2, the game machines 1a, 1b, and 1c perform the data processing allotted to them, write the data resulting from that processing in their own memories, and also write those data to the memories of the other game machines. More specifically, game machine 1a writes data a to memory B, game machine 1b writes data b to memory C, and game machine 1c writes data c to memory A.

Processing is performed similarly from time t2 to time t3, and from time t3 to time t4. Accordingly, in the example diagrammed in FIG. 22, every game machine will have all necessary data written to its memory by the processing executed from time t1 to time t4. This processing is repeated at a fixed interval. The interval for these data communications is set at $1/60$ second or less, according to the display screen refresh rate.

Game machine 1a, the master, also monitors the processing conditions in the other game machines from time t1 to time t4. Based on these results, machine 1a determines the processing load or burden for each game machine for the next cycle, decreasing it slightly when it is too great, and increasing it when excess processing capacity is available. This processing load fluctuates as the game progresses, so distributing the processing in this accommodating fashion is effective in enhancing processing efficiency.

(1) Content of Data Communicated

Vehicle type

Vehicle position (three-dimensional coordinates) x, y, z

Vehicle orientation (three-dimensional coordinates) ax, ay, az

Vehicle magnification (three-dimensional coordinates) dx, dy, dz

Tire steering angle (two front tires, left and right)

Tire rpm (four tires, front and rear, left and right)

Amounts of various wear or damage (external parts, tire performance, brake performance, steering, engine, suspension, wings, etc.)

Vehicle behavior information (spinning, drifting, on fire, etc.)

Number of block the vehicle is currently in

Current lap number

Current pass points

Weather conditions

Air conditions

Track surface conditions

Environmental information (2) Data for Facilitating Communications

Subject I.D. number

Reply flag

Receive flag current condition flag (for distributed processing)

Subject CPU load value (for distributed processing)

CPU processing flag (for error processing) (for distributed processing)

Volume processed (for distributed processing)

Information to be passed to next procedure (for distributed processing)

Information passed to next procedure (for distributed processing)

These data are configured as follows: (data facilitating communications)+(data from environment processor)+ (subject vehicle data)+n*(data for each opponent vehicle)

External Monitor Display Processing

Figure 23:
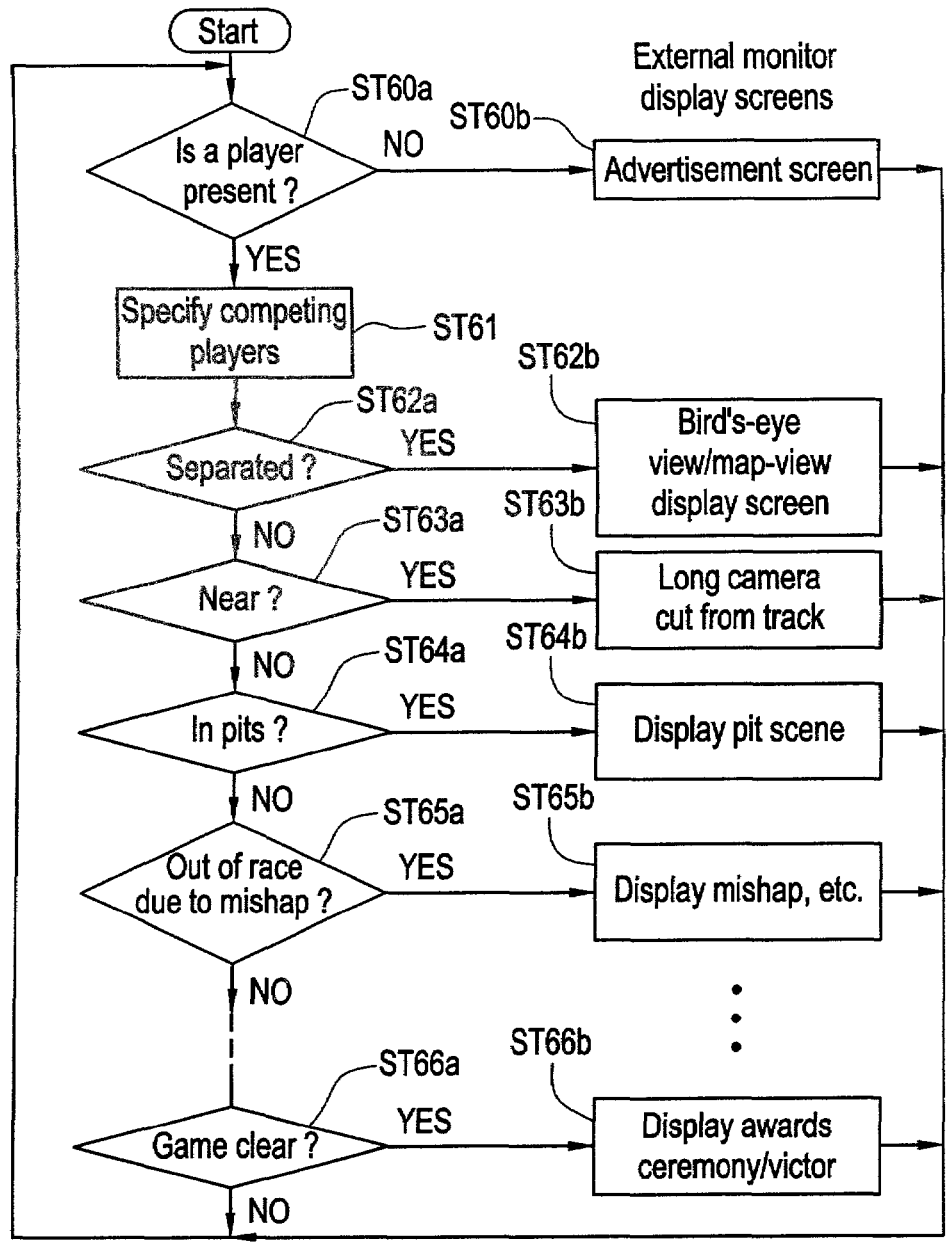
FIG. 23 is a flowchart for external monitor display processing in a game apparatus of the first embodiment of the present invention.

The image processing for the displays on the external monitor 19 depicted in FIGS. 2 and 4 will now be described with reference to FIG. 23.

The program first determines whether or not a player is present (ST 60a). If no player is present, the advertisement screen is displayed on the external monitor 19.

When a player or players are present, the players that are to compete against one another are specified. When there are two or more players, for example, two players are specified that are vying for top position, overtaking and being overtaken (ST 61). The processing subroutines are executed for these specified players.

The program determines whether the specified players are separated from one another by any considerable distance (ST 62a). If they are so separated, the positions and conditions of the players are displayed as a bird's-eye view, or as plotted on a map (ST 62b). This is done because otherwise it would be difficult for a player to figure out where his or her opponent is.

The program determines whether or not the specified players are in close proximity to one another (ST 63a). If they are close enough, a long cut is displayed from a point along the track, something like a TV camera would show covering the race (ST 63b).

The program determines whether or not one of the players has made a pit stop (ST 64a). When a player has pitted, a scene of the pit area is displayed (ST 64b). Thus the other player can readily learn that his or her opponent has pitted, and can alter his or her strategy accordingly. As was explained earlier, the pass count continues to be computed while a car is in the pit area, so a player may want to run up the count as much as possible while an opponent is pitting in order to widen his or her lead significantly.

The program determines whether or not one of the players has been involved in a mishap or left the race (ST 65a). When a player has been in a mishap or has left the race, that situation is displayed (ST 65b). Thus a player can readily learn of an opponent's disadvantage, and alter his or her strategy accordingly. When a player's opponent has been involved in a mishap, that player may enter the pits. Or he or she may try to solidify his or her lead and thereby put the competition out of contention.

The program determines whether one of the players has cleared the game (ST66a). When a game has been cleared, the clearing player is displayed, and a scene of the awards ceremony, for examples is displayed (ST 66b). This also constitutes an advertisement to the spectators.

Leader Marker Display Processing

Figure 24:
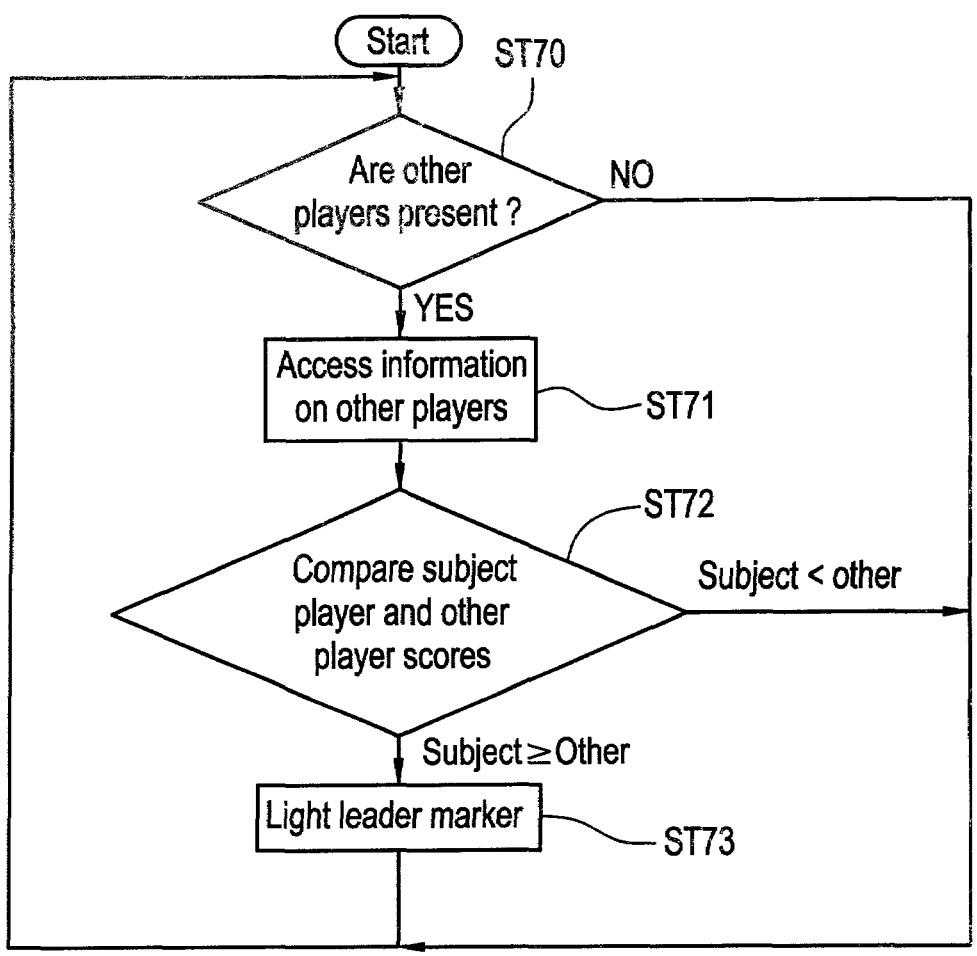
FIG. 24 is a flowchart for leader marker lighting processing in a game apparatus of the first embodiment of the present invention.

The image processing for displays on the external monitor 19 depicted in FIGS. 2 and 4 is now described with reference to FIG. 24.

First, the program determines whether another player is present (ST 70). if another player is present (YES), information on that player is accessed (ST 71). Although distributed processing is adopted in the apparatus of this first embodiment of the present invention, information concerning the other apparatuses is circulating in a loop, as described earlier, so the necessary information can be readily obtained. Based on the information obtained, the scores of the subject player and the other player are compared (ST 72). If the subject player is in the more advantageous position, the leader marker is lit (ST 73).

Thus the leader marker will light for the player with the best score at that point in time. This adds to the excitement by clearly displaying who is in the lead.

Now, when a forked course is provided in a race course, conventionally only the lead driver could select which course to follow. With this embodiment of the present invention, however, since it is possible to join a race in progress, it is permissible to grant the right of selection individually, according to a player's skill, after a certain point level has been attained.

As described in the foregoing, as based on the present invention, players can select any among a plurality of vehicles that are running on the track, and join the race using the selected vehicles. The race game is perpetuated by these multiple vehicles that include the vehicles selected, and the game terminates when the selected vehicles satisfies certain conditions. Thus the race game is perpetuated irrespective of whether or not players are present, and a player can join the game at any time.

Based on the present invention, moreover, when a player joins the game, if the position of the vehicle selected and the designated position where the player is to join the race in progress are distant from each other, the condition of the selected vehicle can be changed and that vehicle forcibly removed to the designated location, so that a joining player need not wait a long time for a game to start.

Based on the present invention, furthermore, when a game is being perpetuated, the performance parameters of the vehicles are made to change with the passage of time. A player manipulates the controls to get the selected vehicle to a prescribed location for restoring the performance parameters, and then returns the vehicle to the race, after its performance parameters have been restored, thus making it possible to incorporate performance degradation and restoration conditions into the game strategy and thus make the game more interesting.

Based on the present invention, moreover, when terminating a game, the termination of that game is determined on the basis of a pass count which indicates the number of times a pass has been transacted between the selected vehicle and another vehicle. Thus the game can be made to develop according to the skill and luck of the players themselves, and inappropriate game terminations avoided.

Based on the present invention, furthermore, control means are provided for acquiring information on race conditions from at least one of the plurality of game machines and for determining display images, as well as an external monitor for displaying the display images determined by the control means, so that images can be provided for the players to reference responsive to the conditions of the vehicles competing in the race.

Based on the present invention, moreover, each of the plurality of game machines comprises a display unit for displaying information pertaining to race conditions, whereby spectators can readily see what is happening in the race.

Based on the present invention, furthermore, each of the plurality of game machines has image processors that process pre-allocated data, and each has a communications controller that outputs processed data to the other game machines, receives data processed by the other game machines, and writes those data to memories in its image processor. Therefore, when one cycle of processing finishes, any game machine can access data processed by the other game machines. Accordingly, all data can be processed while leveling out the processing burden by distributed processing, and all of the data can be used by all of the game machines. Thus efficient data processing is facilitated.

Second Embodiment

A second embodiment of the present invention will now be described, making reference to the drawings.

The game system concerning this embodiment is a communicating game system wherein a plurality of players simultaneously compete in a common game via communications. This communicating game system comprises a plurality of game apparatuses which are consoles fashioned as cockpits which the players sit in. The electrical configuration of each game apparatus is the same as that diagrammed in FIG. 1. The layout for this communicating game system is the same as that diagrammed in FIG. 2. And the diagonal aspect of this communicating game system is as depicted in FIG. 4.

Based on this communicating game system, driving games and the like can be played using each of the game apparatuses 1*a* through 1*d* independently of each other. Or, alternatively, a plurality of players can engage in a competitive driving game via the intercommunicating system.

The competitive game is provided in this communicating game system as a free-entry type of multiple-player competition. Among the features of this game are that it is a free-entry game in which players can join in-progress, that a game is continued until either the game termination conditions are met or the players express their desire to terminate the game, and that it is a game which incorporates a sense of "survival" in that the results of the previous game are automatically reflected in the determination of the participants in the next game.

Figure 25:
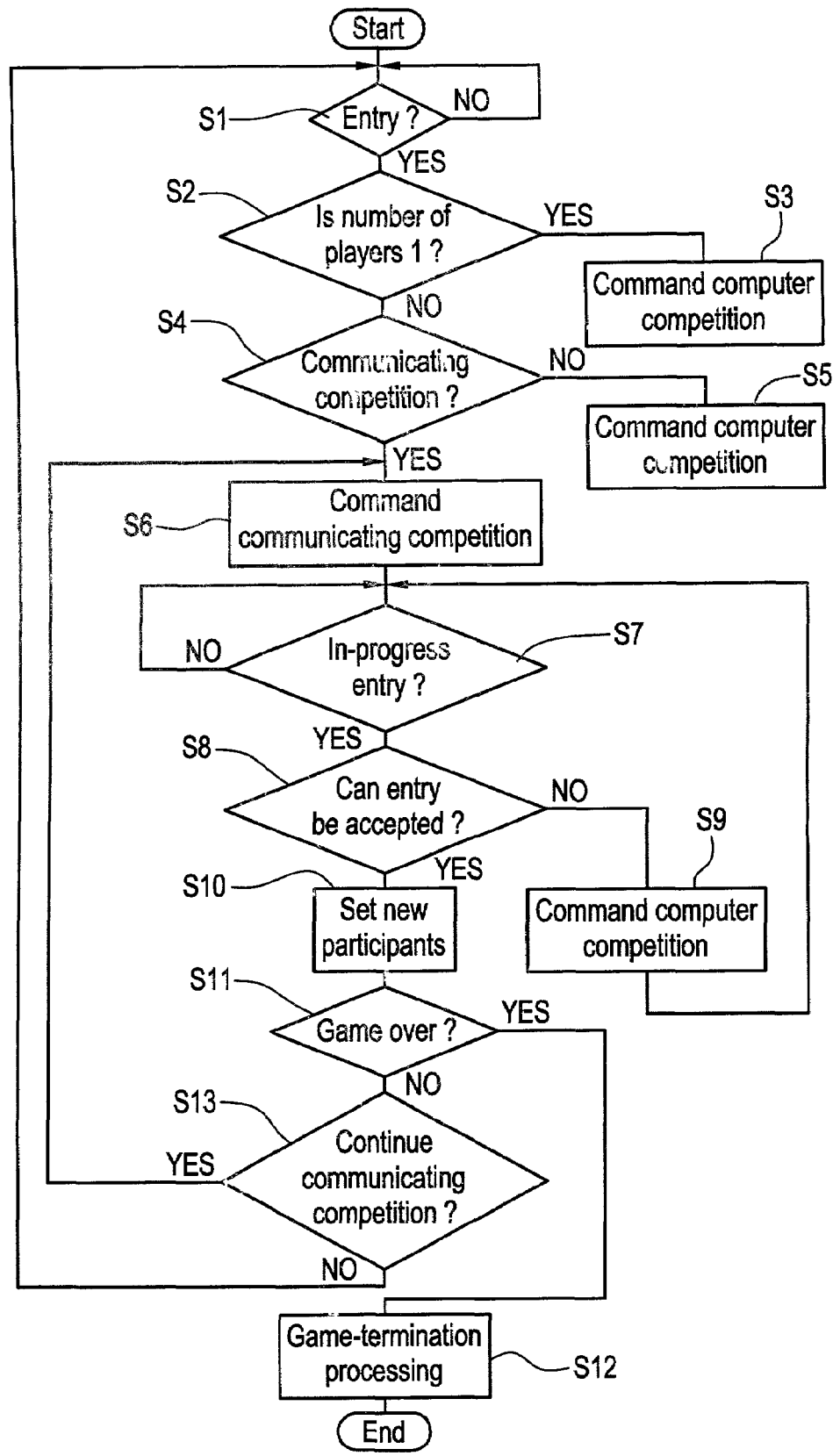
FIG. 25 is a summary flowchart indicating one example of entry processing in a game apparatus in a second embodiment of the present invention.

These features derive from the entry processing program diagrammed in FIG. 25. This program is executed by the controller 18, but it may also be executed by the communications controller 17*a* of the master game apparatus 1*a*, for example. The game is now described in terms of a competitive driving game, but it is not necessarily limited to that mode.

When the program in FIG. 25 is started by the controller 18, it first determines whether or not a player has made entry into the communicating game system (step S1). It then determines whether the number of entries is 1 or not (step S2). If the number of players entered is 1 (step S2, YES), then the controller 18 commands computer competition in the game apparatus 1*a* (1*b*, 1*c,* or 1*d*) where the entry was made (step S3). "Computer competition" is a mode wherein the CPU in the game apparatus competes with the player according to predetermined procedures.

When two or more players have entered (step S2, NO), however, the program determines whether or not this is to be a communicating competition (step S4). This determination is based on information input by button from the player. "Communicating competition" is a mode wherein a game is contested by the players themselves between game apparatuses via the communications network.

Even when it has been determined that the game will not be a communicating competition (step S4, NO), similarly, each game apparatus in which there has been an entry will be commanded to conduct a computer competition (step S5). When, on the other hand, it has been determined that this is a communicating competition (step S4, YES), the controller 18 issues commands to each of the plurality of game apparatuses to conduct a communicating competition (step S6). Thus the communicating competition is contested by multiple players between game apparatuses.

Next, the controller 18, after a game has started between a plurality of players, enters a wait state while repeatedly checking to see whether, during the game in progress, another player has indicated his or her intention to enter (i.e. join the game) (step S7). When there is an in-progress entry (step S7, YES), the program determines whether or not the entry can be accepted (step S8). The determination of this "entry acceptance" involves deciding whether or not conditions will permit the vehicle of another player to join the driving game in the virtual game space.

The driving game here is a race that is being run on a circuit course from a starting ST point (goal GL point) to a goal GL point (starting ST point). For this reason, the determination of entry acceptance depends on whether or not the current time is within the interval from the time when the lead car has reached a final checkpoint PFN (cf. FIG. 27(*a*)) that is established at a prescribed position before the goal GL point to the time that the game is restarted. The final checkpoint PFN is selected at a position on the course that can almost be considered the goal GL point.

When the driving game has already started and entries are not being accepted (step S8, NO), the controller 18 issues a command to the game apparatus where the in-progress entry has been made to conduct a computer competition with that player (step S9), and, again, the processing steps S7 and S8 are repeated. In this computer competition, the CPU in the game apparatus entered allows that player to race artificially at the back of the pack in the driving game that is already underway. However, the vehicle of this player who joined the race in progress will be running in a competition-waiting status, and its standing in the race will not be reflected in the scores of the driving game underway.

Thus a player who wishes to join a communicating game in progress need not wait until the driving game underway is over, but can artificially join the driving game currently in progress. Accordingly, the player joining in-progress will not get bored or give up, but can, from the moment of joining in-progress, begin to share in the game drama and excitement. Also, since the processing in steps S7–S9 is repeatedly executed, a plurality of players joining in-progress can be handled in the same way.

When the lead car in a driving game already underway reaches the final checkpoint, entry acceptance is enabled, that is, it is determined that entry is possible into the real game (step S8, YES). When this happens, processing is executed for setting the new participants in the next round of competition (step S10).

Figure 26:
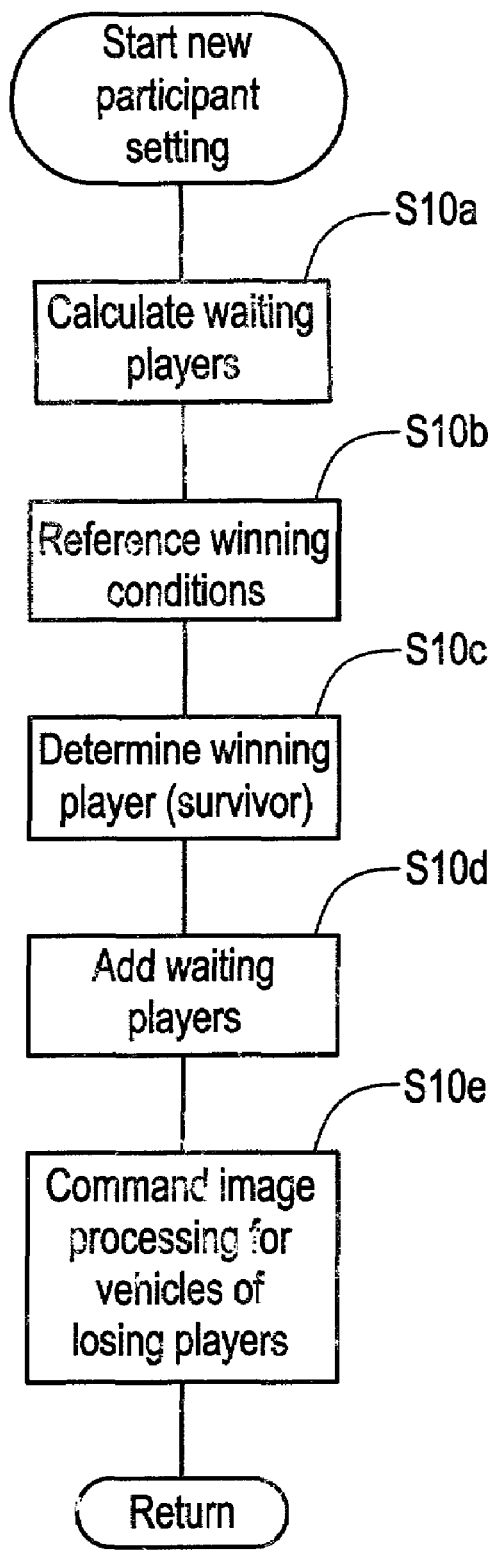
FIG. 26 is a summary flowchart indicating subroutine processing for setting new participants in a game apparatus of the second embodiment of the present invention.

This setting processing, in one example, is performed as diagrammed in FIG. 26. Specifically, the player who has been waiting for entry acceptance to be enabled, that is, the participation-waiting player who joined the game in-progress and has been engaged in a computer competition, is specified (step S10$a$). Then the qualifying conditions are read out of the internal memory into a work area (step S10$b$). The qualifying conditions are what determine the players having the highest standings in the race scores as qualifiers in the driving game. In the case of a driving game between three or more players, for example, the top ranking two drivers might be made the qualifiers. The number of these qualifiers can be made variable in real time depending on the number of players participating in the game or the number of players joining the game in-progress, etc.

The controller 18 determines the rankings according to the order in which vehicles pass the final checkpoint PFN, and determines the qualifiers (remaining drivers) with reference to the qualifying conditions (step S10$c$). Then the waiting player or players are added to the qualifying players, and the new group of competing players is decided (step S10$d$). Players who have lost out cannot participate in the next race, and their game apparatuses are commanded to take some action such as causing the defeated players' vehicles to enter the pit area (step S10$e$).

When the plurality of new players has been automatically determined in this manner for the next race (step 510), the controller 18 verifies whether or not the game termination conditions have been met (step S11). When a game is to be terminated (step S11, YES), then the prescribed game-over processing is performed (step S12), such as displaying the game results. If the game is not over (step S11, NO), then the controller 18 decides whether or not to continue the communicating competition ( step 13). If the communicating competition is to be continued, then, after the communicating competition command has again been issued in processing step S6, the routine from step S7 on, noted above, is repeated. When the communicating competition is not to be continued (step S13, NO), step S1 is returned to, whereupon independent computer competitions can be conducted at individual game apparatuses.

A specific example of entry processing executed by the program routine noted in the foregoing is now described with reference to FIG. 27. It is assumed here that three vehicles, A, B, and C, driven by three players, are racing on a circuit course in virtual game space. As diagrammed at (a) in FIG. 27, the three vehicles A, B, and C make a simultaneous start at time t1 from the starting ST (=goal GL) point, and a communicating competition is implemented.

Figure 27:
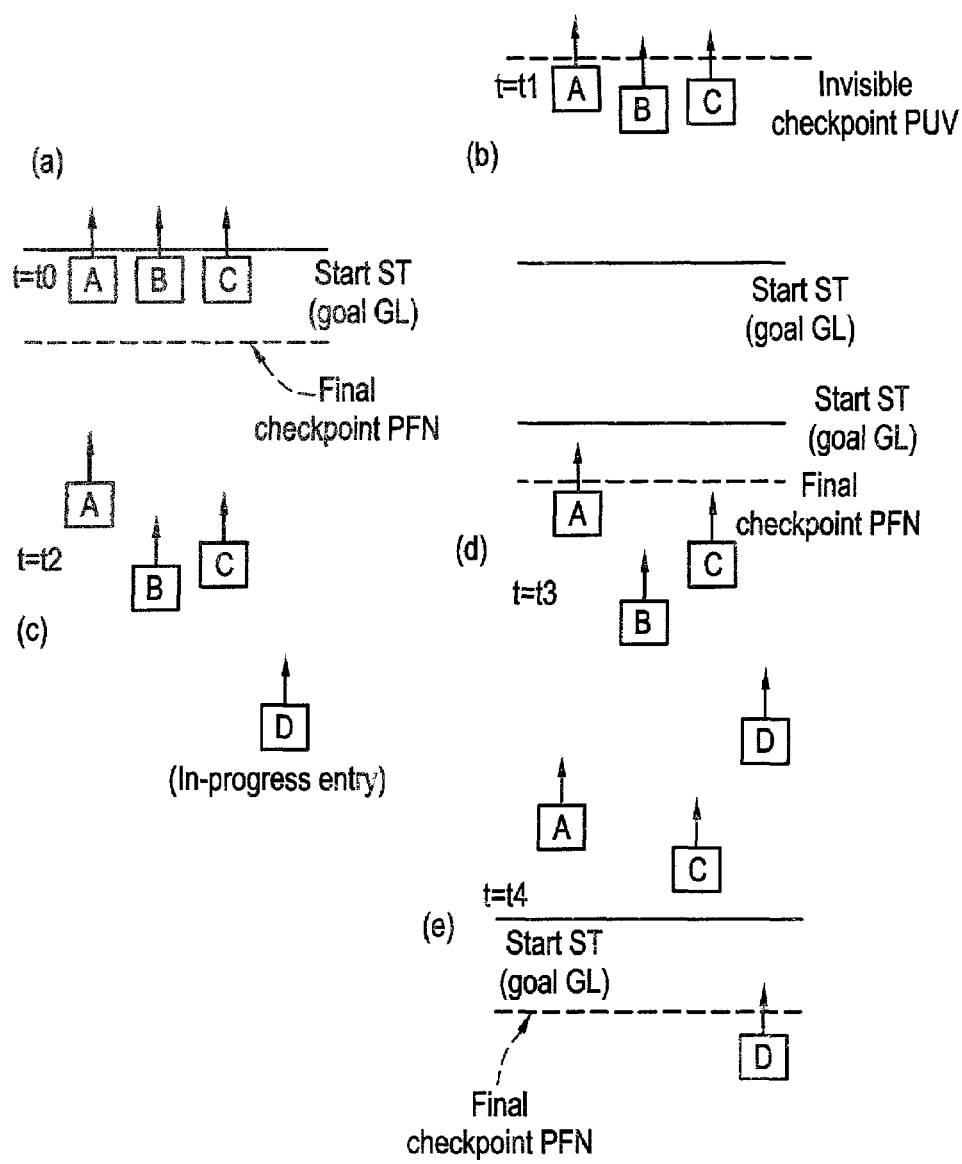
FIG. 27 is an explanatory diagram indicating working examples of entry processing in a game apparatus in the second embodiment of the present invention.

At a point separated from the starting point by some prescribed distance, a checkpoint PUV is established, as diagrammed at (b) in FIG. 27. This checkpoint PUV cannot be seen by the players (i.e. on the screen in the game apparatus). This checkpoint PUV is established for the purpose of encouraging the players in advancing the game. If none of the cars reach this checkpoint PUV within a prescribed time interval, a message such as "Hurry up!" is displayed. And, if the invisible checkpoint PW is still not reached by any of the cars after another prescribed time interval, the program forcibly terminates the game. This waiting time (prescribed time interval), however, is set to a value that would be unthinkable in any normal game.

Now, it is here assumed that, at time t2, as diagrammed at (c) in FIG. 27, another player joins the race in progress. This player's vehicle D is following the pack of the game currently being advanced, engaged in a computer competition. At this time, if the skill of this additional player is very good, he or she may close the distance with the lead cars A, B, and C, and even overtake them. This, however, will not be reflected in the scoring of the game currently in progress. In other words, a player joining a game in progress participates immediately in the game artificially while waiting to join the next race.

When the lead car A reaches the final checkpoint PFN, as diagrammed at (d) in FIG. 27, the order at that point in time is determined as the order at the finish line, and the drivers of cars A and C are determined as the qualifiers according to the qualifying conditions. The driver of the losing car B is forced into the pits, for example, and is excluded from the next race. At the same time, the vehicle D of the player joining the game in progress is added in place of the disqualified car B, and the new competing cars become A, C, and D.

The game continues to advance, without stopping, while these new competitors are being determined, so there is an automatic transition from the previous race to the current race. In other words, as diagrammed at (e) in FIG. 27, the driving game is now continued without interruption from the previous race by the new contestants A, C, and D. In this continuing race, the start will be staggered, with some distance between the in-progress joining car D and the previously competing cars A and C, and between the previously competing cars A and C. These separation distances at the start add spice to the game. A skillful player earns an advantage that is a reflection of his or her score in the previous race, while a player who joined the game in progress may set his or her sights on the advantaged player, and may further heighten interest in the game by overtaking that player.

Thus, with the communicating game system of this embodiment, when another player joins a game already being contested, he or she may freely join at any time, and can artificially participate in the game currently in progress. The player who has joined in-progress, moreover, when the game is a driving game, can participate artificially during a racing competition of fixed scope, and then automatically and without interruption join in the next racing competition (game) of fixed scope. For this reason, the player joining the game in progress can share in the tense excitement of the game from the moment of joining, and thus enhance interest in the game. Also, players in the top standings in the previous racing competition of fixed scope can, without interruption, participate in the next racing competition, so that games offering a sense of "survival" can be provided, and interest in the game further promoted.

The communicating game system described in the foregoing adopts various image processing techniques, noted below, in order to enhance game excitement.

(1) When the car of a player passes over a bumpy road, the screen displayed on the TV monitor 13 jiggles around in proportion to how bad the bumps in the bumpy road are.

(2) A diagonal shadow of each vehicle is displayed to add a three-dimensional effect. The texture of that shadow changes to agree with the place where it is being cast.

(3) Water droplets are graphically displayed by water-droplet polygons.

(4) A wet track surface is graphically displayed by means of a fogging effect.

(5) Evening and night scenes are graphically displayed by means of fogging effects.

(6) Scenes with light striking mountains, etc., are graphically displayed using windows.

The communicating game system of this embodiment has been described as a system for implementing a driving game, but the game system of the present invention is not limited to that mode. It may also be applied to battle games and the like.

More specifically, in a battle game apparatus wherewith a plurality of players engage jointly in a competitive game while controlling a plurality of game apparatuses, respectively, the kind of in-progress entry described in the foregoing can be facilitated. In such cases, the hardware of the embodiment described in detail above can be employed with hardly any modification, and the game can be implemented by modifying primarily the software according to the differences between the games themselves. An example would be a case in which, while one player 1 is engaged in a contest with the CPU, the other player 2 takes over from the CPU and engages player 1 in battle. At this time, there are points of difference, in that the program must be immediately switched over so that player 2 can manipulate the p layer character that had been under the control of the CPU, and, when the game with the player character inherited from the CPU by player 2 ends, it is necessary for player 2 to then select a player character, and therewith engage in a game with player 1. For these purposes, any of several methods may be employed, including the method of returning the vehicles naturally to the start line, the method of executing game-over processing, and the function restoration processing method employing vehicle pit stops, described in detail earlier. In such cases, of course, different situations will be used, commensurate with the battle game in view, such as involving a referee, if it is a boxing game, providing for technical knockouts, having the contestants return to ringside between rounds, and so forth.

Various game aspects can be variously modified, and are not limited to the descriptions in the foregoing. Such aspects include the way in which players joining a game in progress are allowed to temporarily participate artificially (as in having them chasing the pack from behind), the process for determining participation in the next game of fixed scope (as in providing for a racing competition of a fixed number of laps), and the way in which the player characters of losing players are handled (as in making the cars come into the pits), etc.

Figure 28:
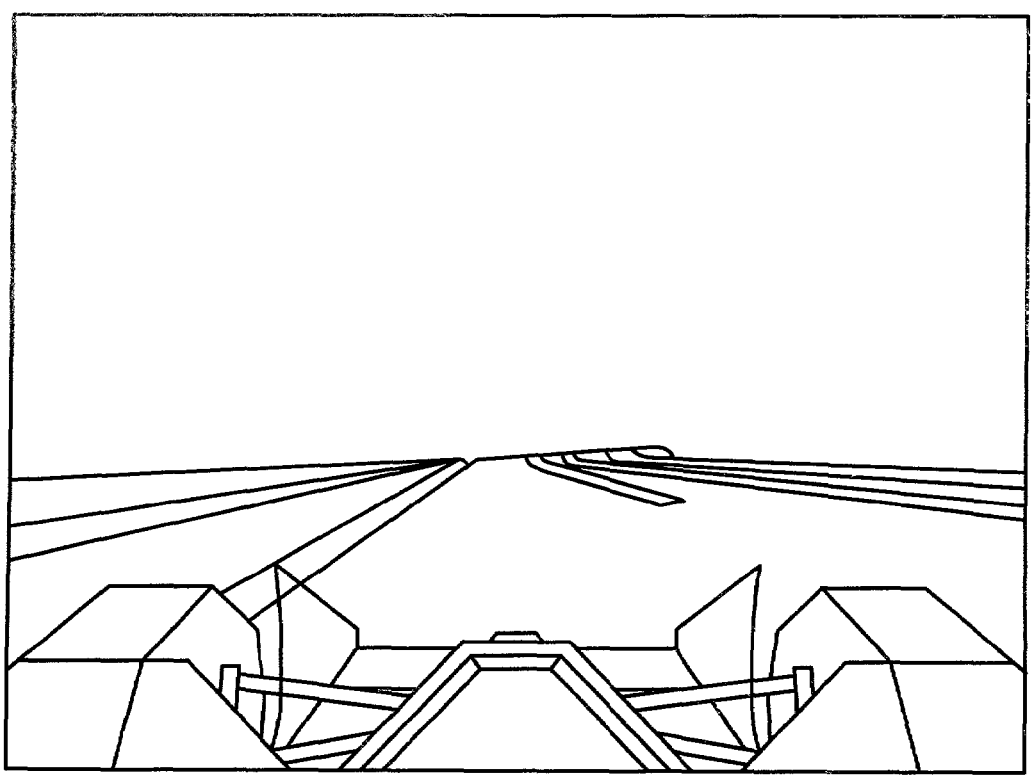
FIG. 28 is a diagram of a screen as viewed from the-cockpit of a pseudo-vehicle in a game apparatus in the second embodiment of the present invention.

The embodiments described herein, moreover, comprise processing functions to make the video seen from the perspective of the player characters move up and down according to irregularities in the track surface and the vehicle operating conditions. FIG. 28 represents-a screen as seen from the perspective of a player character. The vehicles are provided, as disclosed in laid-open patent applications H8-276070 [1996] and H8-276074 [1996], with virtual equipment (such as virtual suspension behavior computing means), and the vehicles are positioned on the ground (mapped) through this virtual suspension apparatus on the virtual ground surface in three-dimensional virtual space.

This suspension behavior is computed from track surface conditions (track surface friction), vehicle steering conditions, and vehicle speed conditions. The video as seen from the player character is altered according to the results of this computation. When the track surface is uneven, for example, the video in FIG. 28 is shown as vibrating up and down. When a rolling behavior is exhibited by the suspension, the video in FIG. 28 is tilted in the direction of vehicle lean.

The CPU produces video and audio to implement the games described in the foregoing, by means of application software provided by such storage media as cartridge I/F or CD-ROW. In addition to the cartridge ROM and CD-ROM storage media already mentioned for storing game machine action programs, programs may also be communicated via internet or PC network.

According to the present invention, as described in the foregoing, a free-entry type of multi-player competitive game system and game method are provided wherewith a player wishing to join a communicating competitive game in progress can immediately participate, albeit artificially, and subsequently automatically and without interruption join the game officially, so that the tediousness of having to wait for a game to end can be eliminated, and wherewith the "intermission" between games is done away with, and multiple games can be continuously perpetuated while, by automatically reflecting the scores of the previous game in the current game, a sense of having "survived" is imparted to a skillful player, thus enhancing the excitement of the game and thereby making it more interesting.

What is claimed is:

1. A game system comprising:

game execution means for enabling a plurality of players to join together and compete in a common game;

a pseudo game for permitting other players different from said plurality of players to join the common game after the common game has started so as to experience the same game session as the plurality of players by playing a substantially identical game session, wherein scores of said other players do not affect a score ranking of said plurality of players competing in said common game;

player setting means that, when competition of a certain scope in the common game has been concluded, reflect a plurality of competition results of said plurality of players for said common game and automatically set a new plurality of players which includes said other players and a number of said plurality of players selected based upon the plurality of competition results; and game perpetuating means for causing said automatically set plurality of players to automatically participate in said common game and for perpetuating said common game; wherein said player setting means include judgment means for determining a finish of said certain scope of said common game, determination means for determining results of said common game when said finish has been determined, and setting means for setting said new plurality of players for said common game after comparing the results of said common game against predetermined conditions.

2. The game system according to claim 1, wherein said common game is a driving game in which vehicles are used in competing in game space.

3. The game system according to claim 2, wherein said pseudo game is for providing competition against vehicles controlled by a computer comprised by the system.

4. The game system according to claim 2, wherein said certain scope of said driving game is a scope wherein a closed course, from start to finish, is run a prescribed number of times, in the game space of said driving game.

5. A game execution method wherewith a plurality of players can participate competitively together in a common game;

when other players join said common game while it is in progress, accepting said other players to join said common game in progress;

when a certain scope of competition in said common game has been concluded in the game space, reflecting a plurality of results of that certain scope of competition by said plurality of players, and automatically setting a new plurality of players comprising said other players and a set of players of said plurality of players selected based upon the plurality of results, wherein said automatically set new plurality of players is automatically made to join said common game; and perpetuating a certain scope said common game.

* * * * *